US012478553B2

(12) United States Patent
Sadzewicz et al.

(10) Patent No.: US 12,478,553 B2
(45) Date of Patent: Nov. 25, 2025

(54) POLYMER VIALS WITH SUBSTANTIALLY FLAT BOTTOMS AND INJECTION STRETCH BLOW MOLDING METHODS FOR MAKING THE SAME

(71) Applicant: SIO2 MEDICAL PRODUCTS, LLC, Auburn, AL (US)

(72) Inventors: Eugene Sadzewicz, Auburn, AL (US); Kenneth Wade Kelly, Auburn, AL (US); Martin Baltazar, Auburn, AL (US); Adam Breeland, Auburn, AL (US); Thomas E. Fisk, Green Valley, AZ (US); David Henton, Midland, MI (US); Brian Maurer, North Wales, PA (US); Ahmad Taha, Auburn, AL (US); Christopher Weikart, Auburn, AL (US)

(73) Assignee: SIO2 MEDICAL PRODUCTS, LLC, Auburn, AL (US)

( * ) Notice: Subject to any disclaimer, the term of this patent is extended or adjusted under 35 U.S.C. 154(b) by 1172 days.

(21) Appl. No.: 17/293,844

(22) PCT Filed: Nov. 13, 2019

(86) PCT No.: PCT/US2019/061293

§ 371 (c)(1),
(2) Date: May 13, 2021

(87) PCT Pub. No.: WO2020/102434

PCT Pub. Date: May 22, 2020

(65) Prior Publication Data

US 2022/0008292 A1 Jan. 13, 2022

(51) Int. Cl.
*A61J 1/14* (2023.01)
*B29C 49/00* (2006.01)
(Continued)

(52) U.S. Cl.
CPC .......... *A61J 1/1468* (2015.05); *A61J 1/1412* (2013.01); *B29C 49/0005* (2013.01);
(Continued)

(58) Field of Classification Search
CPC ..... B29C 2049/4882; B29C 2049/4892; B29L 2031/716
See application file for complete search history.

(56) References Cited

U.S. PATENT DOCUMENTS 3,850,562 A 11/1974 Takeuchi et al.
4,415,085 A 11/1983 Clarke et al.
(Continued)

FOREIGN PATENT DOCUMENTS

FR 2747069 A1 10/1997
JP 2010274950 A * 12/2010
(Continued)

OTHER PUBLICATIONS

Mechanical translation of Sumiya et al (JP 2010274950 A) dated Dec. 2010. (Year: 2010).*
(Continued)

*Primary Examiner* — Galen H Hauth
(74) *Attorney, Agent, or Firm* — David B. Gornish; Eckert Seamans Cherin & Mellott, LLC

(57) ABSTRACT

Disclosed are polymer vials (110, 210) and injection stretch blow molding methods for making the same. A polymer vial has a base (112) having a base surface area and a sidewall (114) extending up from the base. The base and sidewall define an interior (116) configured to house product, the sidewall narrowing at an upper section of the vial to form a neck leading to an opening that provides access to the interior. The vial is optionally round and symmetrical about a central axis, a lower portion of the sidewall including a first surface that is outwardly curved along a first radius having
(Continued)

120
110
118
114
116
112 an imaginary center positioned within the vial. The base is positioned below the first surface and is substantially flat such that at least 80% of the base surface area has a standing base surface occupying a single plane.

19 Claims, 9 Drawing Sheets

(51) Int. Cl.

| | |
|---|---|
| ***B29C 49/06*** | (2006.01) |
| ***B29C 49/12*** | (2006.01) |
| ***B29C 49/48*** | (2006.01) |
| ***B29K 23/00*** | (2006.01) |
| ***B29L 31/00*** | (2006.01) |

(52) U.S. Cl.

CPC .............. *B29C 49/06* (2013.01); *B29C 49/12* (2013.01); *B29C 2049/4881* (2022.05); *B29C 2049/4882* (2013.01); *B29C 2049/4892* (2013.01); *B29K 2023/38* (2013.01); *B29L 2031/716* (2013.01)

(56) References Cited

U.S. PATENT DOCUMENTS

| | | | |
|---|---|---|---|
| 4,479,989 | A | 10/1984 | Mahal |
| 4,484,916 | A | 11/1984 | McPhee |
| 4,516,977 | A | 5/1985 | Herbert |
| 4,561,110 | A | 12/1985 | Herbert |
| 4,592,092 | A | 5/1986 | McPhee |
| 4,911,708 | A | 3/1990 | Maezaki et al. |
| 5,344,036 | A | 9/1994 | Stanescu et al. |
| 5,874,141 | A | 2/1999 | Matsui |
| 7,985,188 | B2 | 7/2011 | Felts et al. |
| 9,937,099 | B2 | 4/2018 | Weikart et al. |
| 2007/0026173 | A1* | 2/2007 | Hussain .................. B32B 27/34 264/510 |
| 2009/0220809 | A1 | 9/2009 | Bertheol et al. |
| 2012/0088714 | A1* | 4/2012 | Kumar ................. B65D 1/0223 206/524.1 |
| 2013/0291632 | A1 | 11/2013 | Felts et al. |
| 2014/0154399 | A1* | 6/2014 | Weikart .................. C23C 16/50 427/2.3 |
| 2018/0049945 | A1 | 2/2018 | Weikart et al. |
| 2019/0070072 | A1 | 3/2019 | Arakawa et al. |

FOREIGN PATENT DOCUMENTS

| | | | |
|---|---|---|---|
| WO | 2014/164928 | A1 | 10/2014 |
| WO | 2017/031354 | A2 | 2/2017 |
| WO | 2017141969 | A1 | 8/2017 |
| WO | 2019/191269 | A1 | 10/2019 |

OTHER PUBLICATIONS

Plastic Equipment and Processing Technology (KUNSTSTOFFTECHNIK), Connalia Fricheretal, Verlag Europa-Lehrmittel Nourney, Vollmer GmbH & Co.KG, p. 418.

"Vial—Wikipedia", Oct. 3, 2018 (Oct. 3, 2018), XP055671069, Wikipedia Retrieved from the Internet: URL:https://web.archive.org/web/2018100306 5501/https://en.wikipedia.org/wiki/Vial [retrieved on Aug. 12, 2021].

International Search Report issued in International Patent Application No. PCT/US2019/061293, mailed Jun. 24, 2020.

* cited by examiner

POLYMER VIALS WITH SUBSTANTIALLY FLAT BOTTOMS AND INJECTION STRETCH BLOW MOLDING METHODS FOR MAKING THE SAME

CROSS-REFERENCE TO RELATED APPLICATIONS

The present application is a U.S. National Phase Application of International Application No. PCT/US2019/061293, entitled "POLYMER VIALS WITH SUBSTANTIALLY FLAT BOTTOMS AND INJECTION STRETCH BLOW MOLDING METHODS FOR MAKING THE SAME," filed Nov. 13, 2019, which claims priority to U.S. Provisional Patent Application No. 62/760,542, filed on Nov. 13, 2018, the contents of each being incorporated herein by reference in their entirety.

BACKGROUND OF THE INVENTION

1. Field of Invention

The disclosed concept relates to plastic containers or vessels and methods of making the same. More particularly, the disclosed concept relates to injection stretch blow molding techniques for producing vials having substantially flat bottoms. The inventors have found these techniques to better control part side-wall thickness variation and generate vials particularly suitable for parenteral drug storage and lyophilization. The disclosed concept provides vials well suited for preparation, storage and lyophilization of drug products.

2. Description of Related Art

An important consideration for pharmaceutical packages or vessels, e.g., parenteral vials, is that the contents have a substantial shelf life.

For decades, most parenteral therapeutics have been delivered to end users in Type I medical grade borosilicate glass vessels such as vials. The relatively strong, impermeable and inert surface of borosilicate glass has performed adequately for most drug products. However, the recent advent of costly, complex and sensitive biologics has exposed the physical and chemical shortcomings of glass pharmaceutical packages, including possible contamination from metals, flaking, delamination, and breakage, among other problems. Moreover, glass contains several components which can leach out during storage and cause damage to the stored material.

In more detail, borosilicate pharmaceutical packages or other vessels, e.g., vials, exhibit a number of drawbacks. Glass is manufactured from sand containing a heterogeneous mixture of many elements (silicon, oxygen, boron, aluminum, sodium, calcium) with trace levels of other alkali and earth metals. Type I borosilicate glass consists of approximately 76% $SiO_2$, 10.5% $B_2O_3$, 5% $Al_2O_3$, 7% $Na_2O$ and 1.5% CaO and often contains trace metals such as iron, magnesium, zinc, copper and others. The heterogeneous nature of borosilicate glass creates a non-uniform surface chemistry at the molecular level.

Glass forming processes used to create glass vessels expose some portions of the vessels to temperatures as great as 1,200° C. Under such high temperatures, alkali ions migrate to the local surface and form oxides. The presence of ions extracted from borosilicate glass devices may be involved in degradation, aggregation and denaturation of some biologics. Many proteins and other biologics must be lyophilized (freeze dried), because they are not sufficiently stable in solution in glass vials.

Presently, a great number of glass containers are manufactured for use in the lyophilization process, wherein a liquid is placed in a vial type container, partially stoppered to permit escape of the water vapor during the sublimation step, followed by complete stoppering through the application of force onto the stopper along the axis of the container. Glass containers have historically been used for pharmaceutical lyophilization because glass provides the desired clarity, resistance to chemical attack and physical stability for storage of lyophilized drugs. Nonetheless, at least for reasons set forth above, glass presents certain drawbacks for this application. A non-glass solution would be desirable, however, prior to the inventors' development of the disclosed concept, there has been no viable non-glass solution for lyophilization vials.

Prior to the present application, a theoretical possible non-glass solution could be plastic. However, there are significant challenges associated with making a viable lyophilization vial out of plastic. One such challenge relates to the properties of the material itself. Although plastic is superior to glass with respect to breakage, dimensional tolerances and surface uniformity, its use in primary pharmaceutical packaging remains limited due to certain shortcomings, including gas permeability and leachables/extractables. Regarding gas permeability, plastic allows small molecule gases to permeate through it. This includes, among other things, permeability to oxygen and water vapor. This can be detrimental the shelf life of a lyophilized drug. Regarding leachables and extractables, plastic vessels contain organic compounds that can extract out into the stored drug product. These compounds can contaminate the drug and/or negatively impact the drug's stability.

The assignee of the present application has developed certain coating technologies and processes that may provide certain benefits of glass on an otherwise plastic vessel. Such coating technologies allow one to leverage the beneficial aspects of plastic, noted above, without the aforementioned countervailing disadvantages. These coating technologies are described below in the specification in conjunction with their potential use with optional aspects of the disclosed concept. Use of such coatings would solve part of the problem. However, there would still remain challenges associated with utilizing existing blow molding methods/apparatus and standard plastic vial configurations for lyophilization applications. To help explain these challenges, some background regarding the blow molding process and configuration of conventional plastic vials is presented now.

A "vial," as that term is used herein, refers generally to a rigid or semi-rigid container or vessel having a comparatively narrow neck and/or mouth. A vial is typically symmetrical about its central axis, is optionally round and is preferably clear in appearance so that its contents are clearly visible.

Bottles or vials may typically be formed using blow molding. Blow molding is a manufacturing process by which hollow plastic parts, e.g., bottles or vials (having a comparatively narrow neck and/or opening), are formed. In general, there are three types of blow molding: (1) extrusion blow molding; (2) injection blow molding; and (3) injection stretch blow molding. In any type of blow molding, the process begins with providing molten plastic and forming it into a parison or preform. The parison is a tube-like piece of plastic with an opening in one end through which compressed air can pass. The parison is clamped into a mold and air is blown into it. The air pressure pushes the plastic out (almost like blowing a balloon) to match the contours of the mold, thus forming a finished part once it has cooled. After the vessel has cooled and hardened, the mold is opened and the part ejected.

Extrusion blow molding is a process that is substantially as described before but also requires spin trimming, which is an additional step involving cutting excess material away. Extrusion blow molded parts are known to have low strength and are consequently not desirable for most containers. Also, the additional processing steps involved render extrusion blow molding unfavorable for making lyophilization vials.

In the standard injection blow molding (IBM) process, the polymer is injection molded onto a core pin; then the core pin is rotated to a blow molding station to be inflated and cooled. This is the least-used of the three blow molding processes, and is typically used to make small medical and single serve bottles. The process is divided into three steps: injection, blowing and ejection. The injection blow molding machine is based on an extruder barrel and screw assembly which melts the polymer. The molten polymer is fed into a hot runner manifold where it is injected through nozzles into a heated cavity and core pin. The cavity mold forms the external shape of the vessel and is clamped around a core rod which forms the internal shape of the preform. The preform consists of a fully formed bottle/jar neck with a thick tube of polymer attached, which will form the body, similar in appearance to a test tube with a threaded neck. An example of such a preform may be found in U.S. Pat. Pub. No. 2009/0220809. The preform mold opens and the core rod is rotated and clamped into the hollow, chilled blow mold. The end of the core rod opens and allows compressed air into the preform, which inflates it to the finished article shape. After a cooling period the blow mold opens and the core rod is rotated to the ejection position. Typically, injection blow molding only suits small capacity bottles as it is difficult to control the base center during blowing. Additionally, there is no increase in barrier strength as the material is not biaxially stretched. Accordingly, standard injection blow molding methods are undesirable for most containers and vessels due to limited uses or product configurations, barrier strength limitations, and other manufacturing disadvantages.

Traditional injection stretch blow molding (ISBM) is typically carried out using one of two different methods, namely single-stage and two-stage.

In the two-stage injection stretch blow molding process, the plastic is first molded into a preform using the injection molding process. These preforms are produced with the necks of the bottles, optionally including threads on one end. These preforms are packaged, and fed later (after cooling) into a reheat stretch blow molding machine. In the ISBM process, the preforms are heated above their glass transition temperature, then blown using high-pressure air into bottles using metal blow molds. The preform is always stretched with a core rod or mandrel as part of the process.

For purposes of providing background to put the disclosed concept in proper context, prior art methods and containers are now described with reference to certain drawing figures. In particular, FIG. 1 illustrates a typical prior art vial 10 that may be made using a blow molding process. The vial 10 includes a base 12 and a sidewall 14 extending up from the base 12. The base 12 and sidewall 14 define an interior 16 configured to house product therein, e.g., a drug product. The sidewall 14 narrows at an upper section of the vial 10 to form a neck 18 leading to an opening 20, from which stored product may be accessed or dispensed. The vial 10 is optionally round and symmetrical about a central axis. As best seen in FIG. 1A, which is an enlarged view of a bottom section of the vial 10 of FIG. 1, the base 12 is convex, forming a dome 26 which extends upwards from a peripheral edge 22 of the base 12. The peripheral edge 22 comprises a standing ring 24, which forms the lowest portion of the base 12 and is configured to contact a flat support surface onto which the vial may rest when it is oriented upright. In other words, the standing ring 24 serves as a standing base in prior art vial 10.

Vial 10 of FIG. 1 may be made with a blow molding process using a prior art mold 40, a portion of which is depicted in the schematic drawing of FIG. 2. The mold 40 includes a first mold part 42*a* and a second mold part 42*b*, the first and second mold parts 42*a,b* coming together about a central axis to form the outer shape of the sidewall 14 and standing ring 24 of the vial 10. First and second mold parts 42*a,b* mirror each other in size and configuration. The mold also includes a "cup style" (i.e., curved and not flat) base mold 44 that is configured to form the outer shape of much of the base 12 of the vial 10. The first mold part 42*a*, second mold part 42*b* and base mold 44 together define a mold cavity 50 into which a molten polymer preform or parison may be blown to conform to the surfaces of those parts of the mold 40, thus forming the vial 10.

The cup style base mold 44 includes a domed surface 48 configured to form the dome 26 of the base 12 of vial 10. The first and second mold parts 42*a,b* each comprise a ring portion 46 adjacent the base mold 44. The ring portion 46 is positioned slightly lower than the domed surface 48 of the base mold 44. In other words, the base mold 44 protrudes higher than the lowest portions of first and second mold parts 42*a,b*. The ring portion 46 corresponds to the outer surface of the standing ring 24 of vial 10. The prior art mold 40 thus forms the peripheral edge 22 and standing ring 24 (i.e., the standing surface of vial 10) using first and second mold parts 42*a,b*—not with the base mold 44.

Applicant has found that vial 10, mold 40 and the method used to produce vial 10, is not preferred for use in lyophilization. Dimensions and dimensional tolerances of a vial are critical to the thermal efficiency of the vial if used for lyophilization. Existing methods/molds for blow-molding containers or vessels, as described above, are deficient in producing the necessary dimensions and dimensional tolerances for improved thermal efficiency necessary for lyophilization. There is a need for a non-glass lyophilization vial having gas and solute barrier properties which approach the properties of glass. There is a further need for a non-glass vial having a configuration, dimensions and dimensional tolerances that provide optimal thermal efficiency for lyophilization. There is also a need for novel manufacturing equipment and processes which produce thermally efficient containers or vessels (e.g., vials) for lyophilization. Neither prior art vial 10 nor other plastic containers proposed for parenteral purposes, e.g., those disclosed in U.S. Pat. Nos. 4,415,085, 4,479,989, 4,484,916, 4,592,092, 4,516,977, 4,561,110 and 5,344,036, appear to be useful as a substitute for the glass vials in conventional lyophilization processes.

SUMMARY OF THE INVENTION

Accordingly, in one optional embodiment, a polymer vial is provided. The vial includes a base having a base surface area, a sidewall extending up from the base, the base and sidewall defining an interior configured to house product. The sidewall narrows at an upper section of the vial to form a neck leading to an opening that provides access to the interior. The vial is optionally round and symmetrical about a central axis, a lower portion of the sidewall including a first surface that is outwardly curved along a first radius having an imaginary center positioned within the vial. The base is positioned below the first surface and is substantially flat such that at least 80% of the base surface area, optionally at least 85% of the base surface area, optionally at least 90% of the base surface area, includes a standing base surface occupying a single plane.

Optionally, in any embodiment of a vial according to the disclosed concept, the vial is made from a clear thermoplastic material, optionally a polyolefin.

Optionally, in any embodiment of a vial according to the disclosed concept, the base in its entirety is positioned below the first surface.

Optionally, in any embodiment of a vial according to the disclosed concept, the vial further includes a second surface that extends from and is positioned below the first surface. The second surface is inwardly curved along a second radius having an imaginary center positioned outside of the vial. The second surface terminates at a peripheral edge of the base from which the standing base surface extends inwardly towards the central axis. The standing base is configured to contact and rest on a flat support surface so as to orient the vial in an upright position.

Optionally, in any embodiment of a vial according to the disclosed concept, the vial is produced by an injection stretch blow molding process.

Optionally, in any embodiment of a vial according to the disclosed concept, the vial is made from an olefin polymer or copolymer, optionally cyclic olefin polymer or cyclic olefin copolymer.

Optionally, in any embodiment of a vial according to the disclosed concept, the vial wall includes a PECVD water barrier coating or layer having a water contact angle of from 80 to 180 degrees, optionally from larger than 80 degrees to less than 180 degrees, optionally from 90 degrees to 160 degrees, optionally from 100 degrees to 150 degrees, optionally from 110 degrees to 150 degrees. Optionally, the PECVD water barrier coating or layer is applied through a process that includes: in a PECVD apparatus, supplying a water barrier coating or layer precursor to the vial and creating a plasma using the same, the water barrier coating or layer precursor comprising as least one of a saturated or unsaturated, linear or cyclic aliphatic fluorocarbon precursor having from 1 to 10, optionally 1 to 6, optionally 2 to 6 carbon atoms and from 4 to 20 fluorine atoms per molecule, optionally hexafluropropylene ($C_3F_6$), octafluorocyclobutane ($C_4F_8$), tetrafluoroethylene ($C_2F_4$), hexafluoroethane ($C_2F_6$), hexafluoropropylene ($C_3F_6$), octafluorocyclobutane ($C_4F_8$), perfluorohexane ($C_6F_{14}$) or perfluoro-2-methyl-2-pentene ($C_6F_{12}$), the water barrier coating or layer precursor further comprising a saturated or unsaturated hydrocarbon having from 1 to 6 carbon atoms, for example lower alkanes having from 1 to 4 carbon atoms, alkenes or alkynes having from 2 to 4 carbon atoms, for example acetylene ($C_2H_2$) or methane ($CH_4$), optionally acetylene ($C_2H_2$), a saturated or unsaturated hydrofluorocarbon having from 1 to 6 carbon atoms, or any combination thereof. Optionally, in any embodiment of the vial, a PECVD tri-layer coating set (having a tri-layer, SiOx barrier layer and pH protective layer) is deposited onto the PECVD water barrier layer.

Optionally, in any embodiment of a vial according to the disclosed concept, the polymer vial of any previous claim further comprising a cap to fully or partially close the opening.

Optionally, in any embodiment of a vial according to the disclosed concept, the vial has drug contents stored in the interior space, wherein the drug contents optionally comprise biologic drugs, gene therapy or viral vectors.

In an optional aspect of the disclosed concept, a method for making a polymer vial by injection stretch blow molding is provided. The method includes providing a mold, the mold having a first mold part and a second mold part. The first mold part and second mold part are configured to meet along a central axis to form an outer shape of a sidewall of the vial. Respective interior sizes and configurations of the first mold part and second mold part mirror each other. The mold further includes a base mold configured to form a base of the vial. The base mold has a substantially flat molding surface, wherein at least 80%, optionally at least 85%, optionally at least 90%, of the molding surface of the base mold occupies a single plane. The first mold part, second mold part and base mold together define a mold cavity when the mold is in a blowing position in which the base mold is in position relative to the first and second mold parts to form the base of the vial. The method further includes providing a mandrel within the mold and a molten polymer preform onto the mandrel, stretching the preform with the mandrel to extend an end thereof optionally past respective molding surfaces of the first mold part and second mold part, optionally wherein the base mold is axially distal to the base mold location when the mold is in the blowing position. The method further includes moving the base mold axially towards the first mold part and second mold part to place the mold in the blowing position. The method further includes blowing gas into the preform such that the preform expands within the molding space and conforms to respective surfaces of the first mold part, second mold part and the base mold, when the mold is in the blowing position, wherein the substantially flat molding surface of the base mold is positioned entirely axially below respective molding surfaces of the first mold part and second mold part.

Optionally, in any embodiment of the method for making a polymer vial by injection stretch blow molding according to the disclosed concept, neither the first mold part nor the second mold part form any portion of the base of the vial.

Optionally, in any embodiment of the method for making a polymer vial by injection stretch blow molding according to the disclosed concept, the base mold forms no portion of the sidewall of the vial.

Optionally, in any embodiment of the method for making a polymer vial by injection stretch blow molding according to the disclosed concept, each of the first mold part and second mold part include a first curved mold surface that leads to a second curved mold surface. The first curved mold surface follows a radius with an imaginary center positioned in the mold cavity. The second curved mold surface follows a radius with an imaginary center positioned outside the mold cavity. These curves and radii are from the perspective of a cross sectional view, it being understood that the geometry of the mold and corresponding vial is three dimensional around the perimeter or circumference of the mold and corresponding vial. Optionally, no portion of the substantially flat molding surface of the base mold extends axially above the second curved mold surface.

Optionally, the disclosed concept relates to a polymer vial, optionally clear thermoplastic vial made by any of the methods disclosed herein.

In an optional aspect, the disclosed concept relates to a method including providing a polymer vial according to any embodiment disclosed herein that is filled with a product in solution form and lyophilizing the product to render a dry powdered lyophilized form of the product within the vial.

In an optional aspect of the disclosed concept, a mold for making a vial is provided. The mold includes a first mold part and a second mold part, the first mold part and second mold part being configured to meet along a central axis (i.e., central axial plane) to form an outer shape of a sidewall of the vial. Respective interior sizes and configurations of the first mold part and second mold part mirror each other. The mold further includes a base mold configured to form a base of the vial, the base mold having a substantially flat molding surface, wherein at least 80%, optionally at least 85%, optionally at least 90%, optionally all, of the molding surface of the base mold occupies a single plane. The first mold part, second mold part and base mold together define a mold cavity when the mold is in a blowing position in which the base mold is in position relative to the first and second mold parts to form the base of the vial, such that the substantially flat molding surface of the base mold is positioned entirely axially below respective molding surfaces of the first mold part and second mold part. Optionally, neither the first mold part nor the second mold part are configured to form any portion of the base of the vial. Optionally, the base mold is configured to form no portion of the sidewall of the vial. Optionally, each of the first mold part and second mold part include a first curved mold surface that leads to a second curved mold surface, the first curved mold surface following a radius with an imaginary center positioned in the mold cavity, the second curved mold surface following a radius with an imaginary center positioned outside the mold cavity. Optionally, no portion of the substantially flat molding surface of the base mold extends axially above the second curved mold surface.

Optionally, in any embodiment of a vial according to the disclosed concept, a lyophilized product is stored within the interior, the lyophilized product configured to be reconstituted into a liquid product. Optionally, the lyophilized product is a biologic drug, a gene therapy or viral vector.

Optionally, in any embodiment, the vial of the disclosed concept may more generally be referred to as container or vessel.

BRIEF DESCRIPTION OF SEVERAL VIEWS OF THE DRAWINGS

The background of the invention and the invention itself will be described in conjunction with the following drawings in which like reference numerals designate like elements and wherein.

DETAILED DESCRIPTION OF PREFERRED EMBODIMENTS OF THE INVENTION

The disclosed concept will now be described more fully with reference to the accompanying drawings, in which several embodiments are shown. This invention may, however, be embodied in many different forms and should not be construed as limited to the embodiments set forth here. Rather, these embodiments are examples of the invention, which has the full scope indicated by the language of the claims. Like numbers refer to like elements throughout. Unless indicated otherwise, the features characterizing the embodiments and aspects described in the following may be combined with each other, and the resulting combinations are also embodiments of the present invention.

Definitions

As used in this disclosure, an "organosilicon precursor" is a compound having at least one of the linkages:

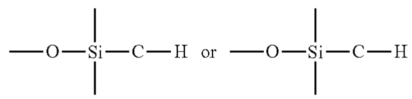

which is a tetravalent silicon atom connected to an oxygen or nitrogen atom and an organic carbon atom (an organic carbon atom being a carbon atom bonded to at least one hydrogen atom). A volatile organosilicon precursor, defined as such a precursor that can be supplied as a vapor in a plasma enhanced chemical vapor deposition (PECVD) apparatus, is an optional organosilicon precursor. Optionally, the organosilicon precursor is selected from the group consisting of a linear siloxane, a monocyclic siloxane, a polycyclic siloxane, a polysilsesquioxane, an alkyl trimethoxysilane, a linear silazane, a monocyclic silazane, a polycyclic silazane, a polysilsesquiazane, and a combination of any two or more of these precursors. Preferably, the organosilicon precursor is octamethylcyclotetrasiloxane (OMCTS). Values of w, x, y, and z are applicable to the empirical composition $Si_wO_xC_yH_z$ throughout this specification. The values of w, x, y, and z used throughout this specification should be understood as ratios or an empirical formula (for example for a coating or layer), rather than as a limit on the number or type of atoms in a molecule. For example, octamethylcyclotetrasiloxane, which has the molecular composition $Si_4O_4C_8H_{24}$, can be described by the following empirical formula, arrived at by dividing each of w, x, y, and z in the molecular formula by 4, the largest common factor: $Si_1O_1C_2H_6$. The values of w, x, y, and z are also not limited to integers. For example, (acyclic) octamethyltrisiloxane, molecular composition $Si_3O_2C_8H_{24}$, is reducible to $Si_1O_{0.67}C_{2.67}H_8$. Also, although $SiO_xC_yH_z$ is described as equivalent to $SiO_xC_y$, it is not necessary to show the presence of hydrogen in any proportion to show the presence of $SiO_xC_y$.

"PECVD" refers to plasma enhanced chemical vapor deposition.

Optional Vial Configuration and Equipment and Process for Molding

Figure 1A:
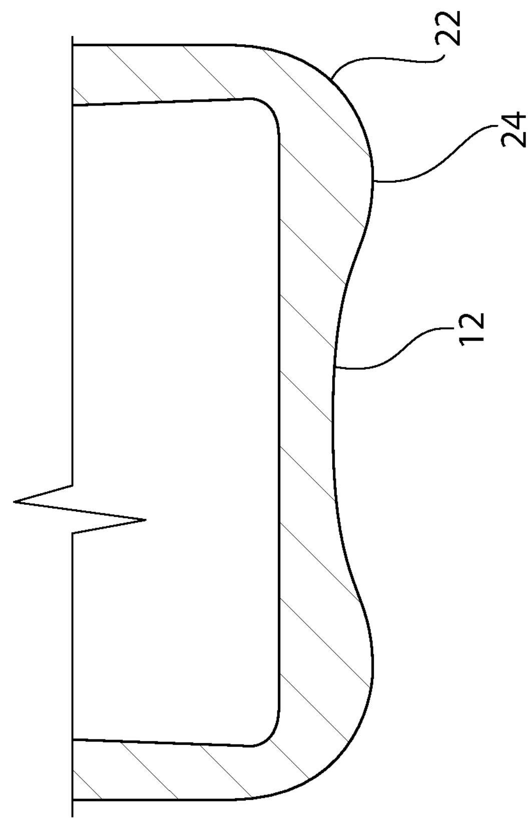
FIG. 1A is an enlarged view of a bottom section of the vial of FIG. 1.
Figure 1:
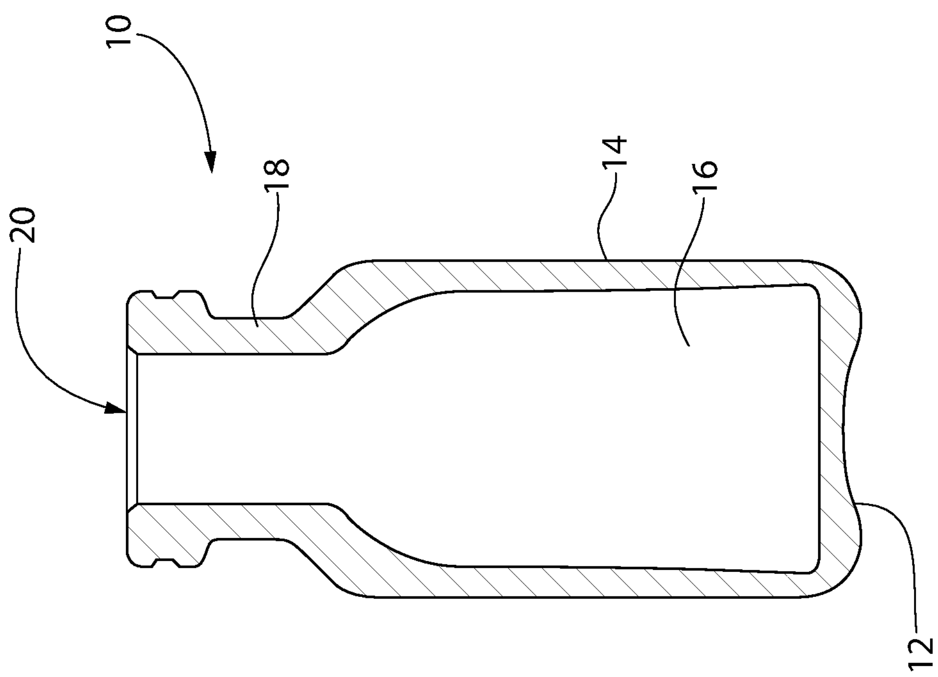
FIG. 1 is a simplified section view of a prior art vial formed by a blow molding process.
Figures 3, 3A:
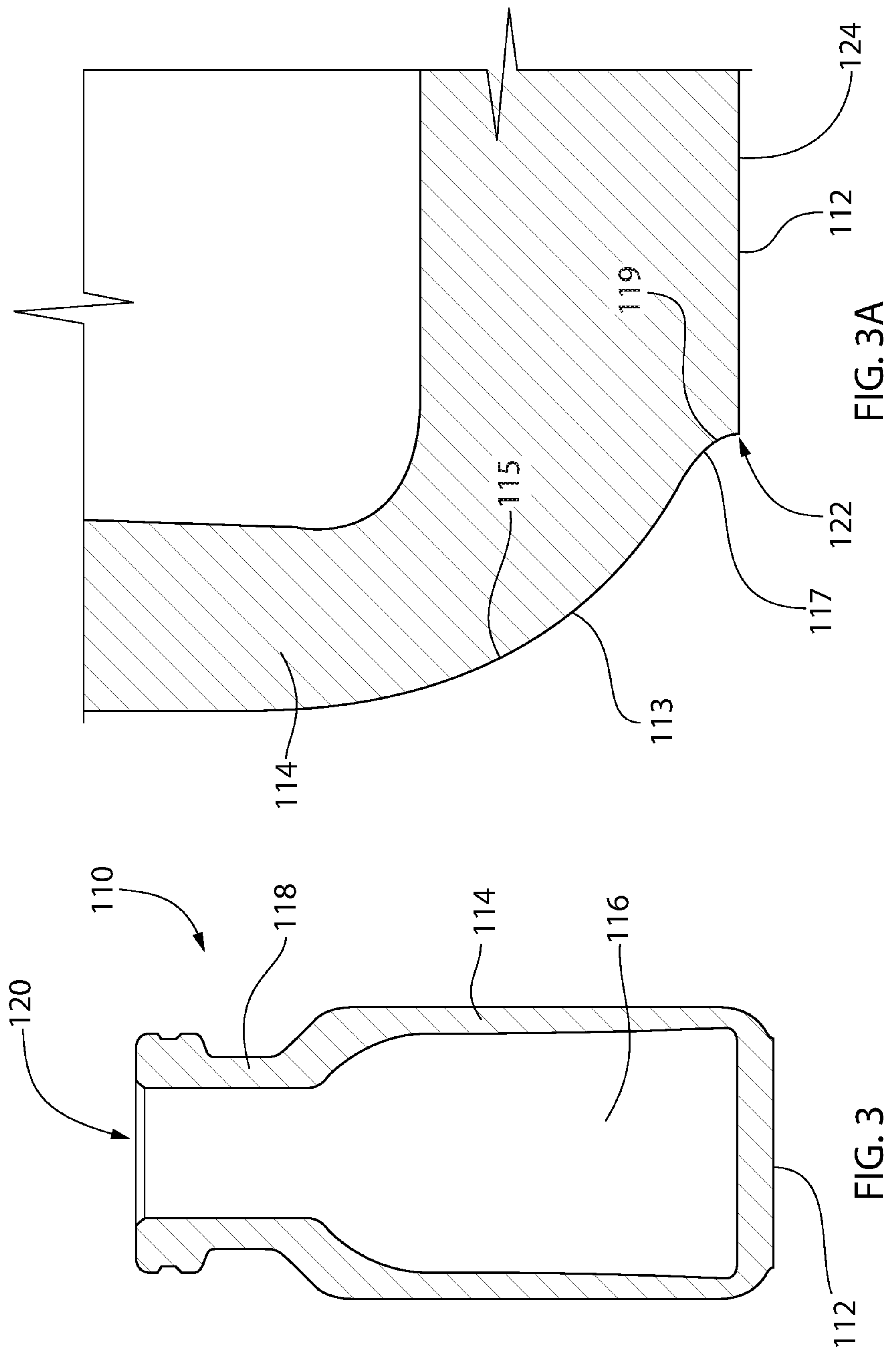
FIG. 3 is a simplified section view of a vial formed by a blow molding process, optionally injection stretch blow molding process, in accordance with an optional aspect of the disclosed concept.
FIG. 3A is an enlarged view of a portion of the vial of FIG. 3.

FIG. 3 illustrates an optional embodiment of a vial 110 according to the disclosed concept. The vial 110 may be made using an injection stretch blow molding process, as explained in detail, below. The vial 110 includes a base 112 and a sidewall 114 extending up from the base 112. The base 112 and sidewall 114 define an interior 116 configured to house product therein, e.g., a lyophilized drug product. The sidewall 114 narrows at an upper section of the vial 110 to form a neck 118 leading to an opening 120, from which stored product may be accessed or dispensed. The vial 110 is preferably round and symmetrical about a central axis. As best seen in FIG. 3A, which is an enlarged view of a bottom left section of the vial 110 of FIG. 1, the base 112 is flat. In a preferred embodiment, the base 112 is completely flat, with the possible exception of slight relief in the gate area, as an artifact of the injection stretch blow molding process. With a substantially or completely flat base 112, the vial 110 comprises a flat standing base 124, which is configured to contact a flat support surface (e.g., tabletop or lyophilization shelf) onto which the vial may rest when it is oriented upright. The standing base 124 provides a horizontal rest surface for the vial 110. The flat standing base 124 helps to facilitate heat transfer into the vial 110 and thus provides a vial 110 that is more thermally efficient, e.g., for lyophilization, than prior art vial 10 of FIG. 1.

As noted above, the base 112 is completely or at least substantially flat. Optionally, in any embodiment, at least 80% of the base 112 surface area comprises a surface occupying a single plane. Optionally, in any embodiment, at least 85% of the base 112 surface area comprises a surface occupying a single plane. Optionally, in any embodiment, at least 90% of the base 112 surface area comprises a surface occupying a single plane. Optionally, in any embodiment, at least 95% of the base 112 surface area comprises a surface occupying a single plane. Optionally, in any embodiment, 100% of the base 112 surface area comprises a surface occupying a single plane. Optionally, in any embodiment, 80% to 100%, optionally 85% to 100%, optionally 90% to 100%, optionally 85% to 99%, optionally 90% to 99%, of the base 112 surface area comprises a surface occupying a single plane.

The sidewall 114, at a lower portion thereof, optionally includes a first surface 113 comprising an outer radius 115, which leads to a second surface 117 comprising an inner radius 119. The term "outer radius" here refers to a radius that is outwardly curved (relative to the vial), having an imaginary center positioned within the vial. The first surface 113 curve is preferably less than 90°. The term "inner radius" here refers to a radius that is inwardly curved (relative to the vial), having an imaginary center positioned outside of the vial. Optionally, the inner radius 119 is smaller, optionally substantially smaller, than the outer radius 115. For example, the inner radius 119 is optionally at least 100 times smaller, optionally at least 50 times smaller, optionally at least 20 times smaller, optionally at least 10 times smaller, optionally at least 5 times smaller, optionally at least 2 times smaller than the outer radius 115. Optionally, the inner radius 119 is 2-50 times smaller, optionally 2-20 times smaller, optionally 2-10 times smaller, optionally 2-5 times smaller than the outer radius 115. The second surface 117 terminates at a peripheral edge 122 of the base 112. The standing base 124 extends inward from the peripheral edge 122.

Figure 4:
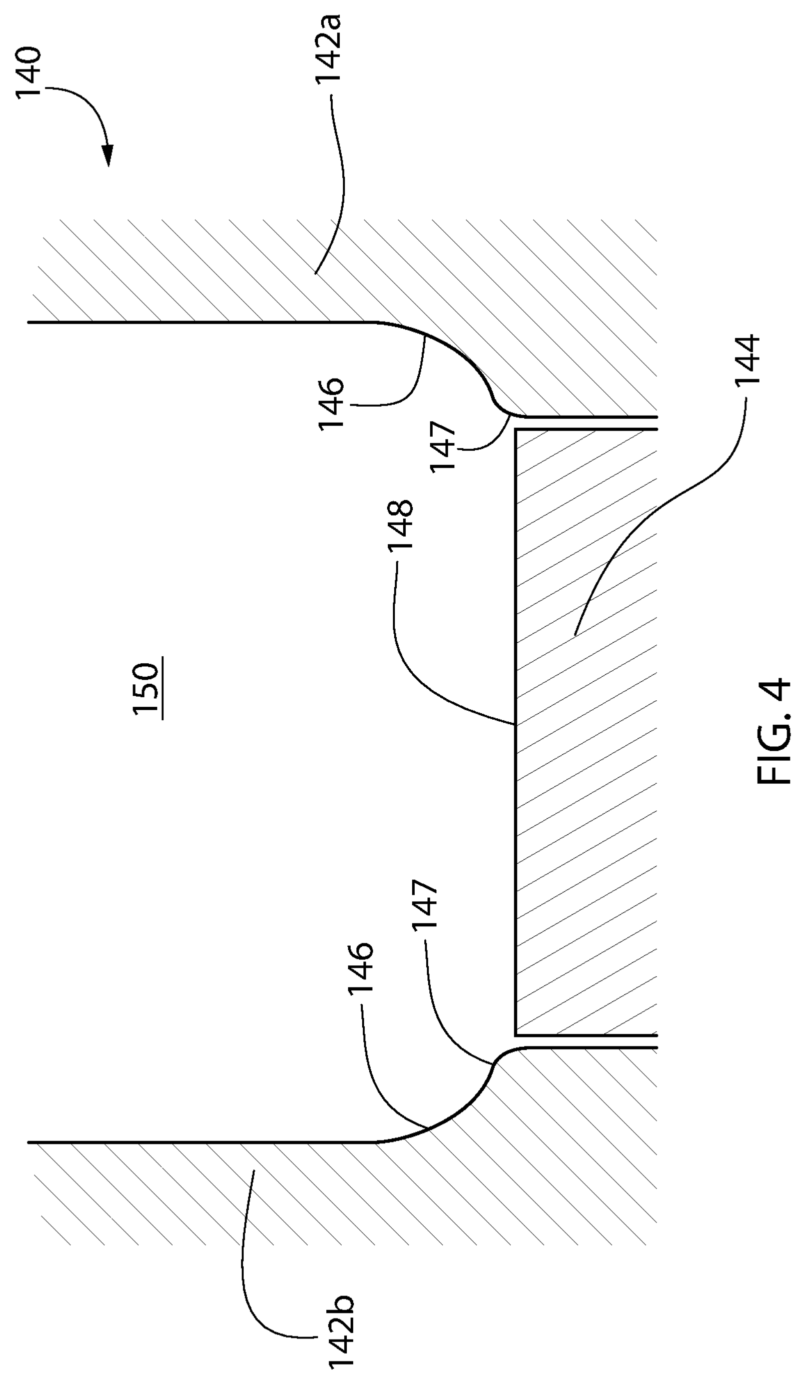
FIG. 4 is a simplified schematic drawing of a portion of a blow mold according to an optional aspect of the disclosed concept that may be used to form the vial of FIG. 3.

Vial 110 may be made with an injection stretch blow molding process using mold 140, a portion of which is depicted in the schematic drawing of FIG. 4. The mold includes a first mold part 142*a* and a second mold part 142*b*, the first and second mold parts 142*a,b* coming together at a central axis (i.e., central axial plane) to form the outer shape of the sidewall 114 of the vial 110. First and second mold parts 142*a,b* mirror each other in size and configuration. The mold 140 also includes a "push up style" base mold 144 that is configured to form the outer shape of the entire base 112 of the vial 110. The first mold part 142*a*, second mold part 142*b* and base mold 144 together define a mold cavity 150 into which a molten polymer preform may be stretched and then blown to conform to the surfaces of those parts of the mold 140, thus forming the vial 110.

The push up style base mold 144 includes a flat or planar molding surface 148 configured to form the flat standing base 124 of the base 112 of vial 110. The first and second mold parts 142*a,b* each comprise a first curved mold surface 146 leading to a second curved mold surface 147. The first curved mold surface 146 has a radius with an imaginary center positioned in the mold cavity 150. The second curved mold surface 147 has a radius with an imaginary center positioned in each respective mold part 142*a,b* (i.e., outside the mold cavity 150). First curved mold surface 146 forms the outer shape of the first surface 113 of the sidewall 114 of vial 110. Second curved mold surface 147 forms the outer shape of the second surface 117 of the sidewall 114 of the vial 110. These curves and radii are from the perspective of a cross sectional view, it being understood that the geometry of the mold and corresponding vial is three dimensional around the perimeter or circumference of the mold and corresponding vial.

Figure 2:
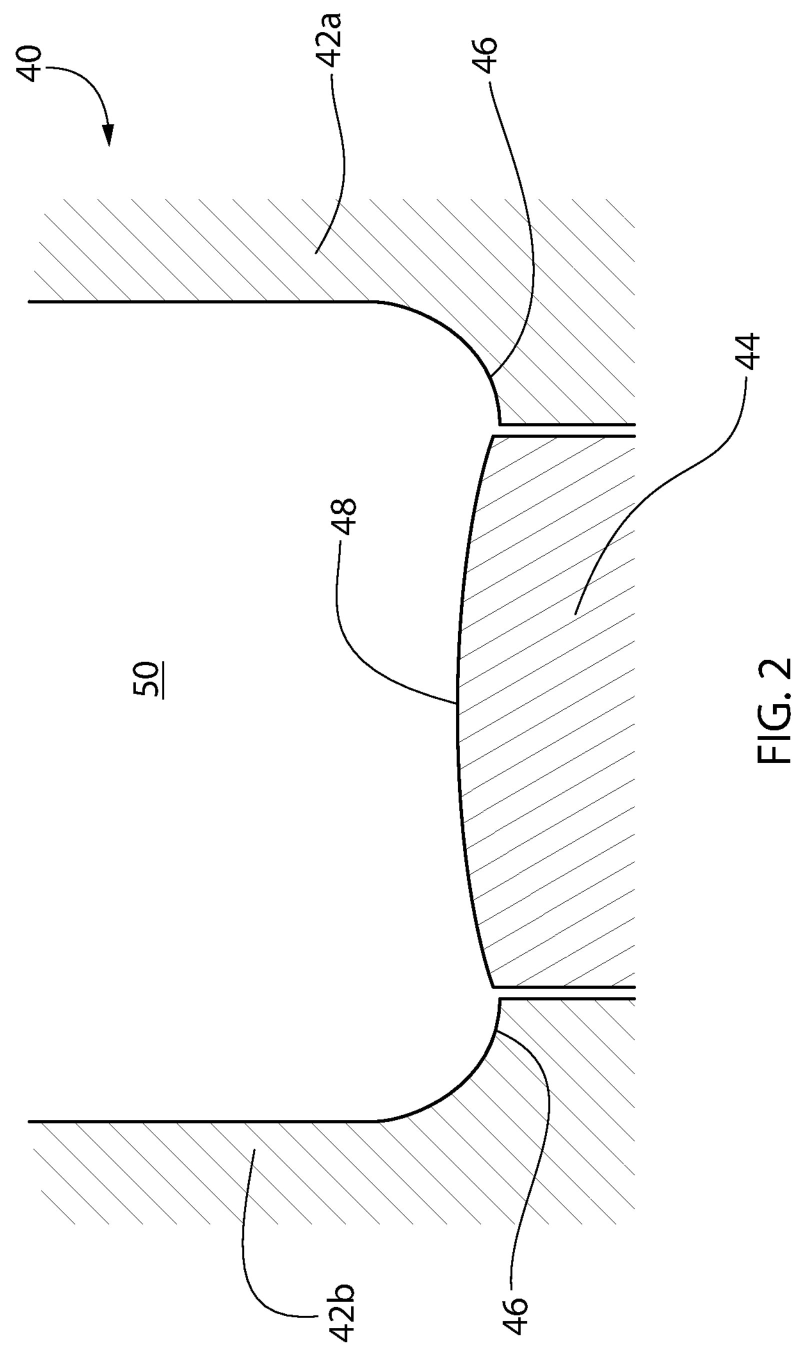
FIG. 2 is a simplified schematic drawing of a portion of a prior art blow mold that may be used to form the vial of FIG. 1.

Notably, the base mold 144 and its flat or planar molding surface 148 sit below the lowest molding surfaces (e.g., the second curved mold surface 147) of the first and second mold parts 142*a,b* when the corresponding vial 110 is formed. This stands in contrast with the prior art mold 40 of FIG. 2, in which the base mold 44 projects above the lowest molding surfaces of the first and second mold parts 42*a,b*. As a consequence, the prior art vial 10 of FIG. 1 has a standing base (in that case, standing ring 24) which is formed by the first and second mold parts 42*a,b*, while, by contrast, the vial 110 of the disclosed concept (FIGS. 3 and 3A) has a standing base 124, which is formed by the base mold 144. Another important difference is that the base 12 of prior art vial 10 is domed while base 112 of the vial 110 of the disclosed concept is completely flat (with the possible exception of slight relief in the gate area). Likewise, the base mold 144 molding surface 148 of mold 140 is completely flat, with the possible optional exception of a very slight center indent to ensure the gate isn't protruding, in contrast to the domed surface 48 of prior art base mold 44.

The aforementioned structural features of mold 140 and corresponding vial 110, in combination with optional injection stretch blow molding processes, result in a plastic vial 110 that is very thermally efficient and thus ideal for lyophilization. An overview of the injection stretch blow molding process as applied to the disclosed concept is now provided, followed by a description of optional features and advantages of the vial 110.

Figures 5A, 5B, 5C:
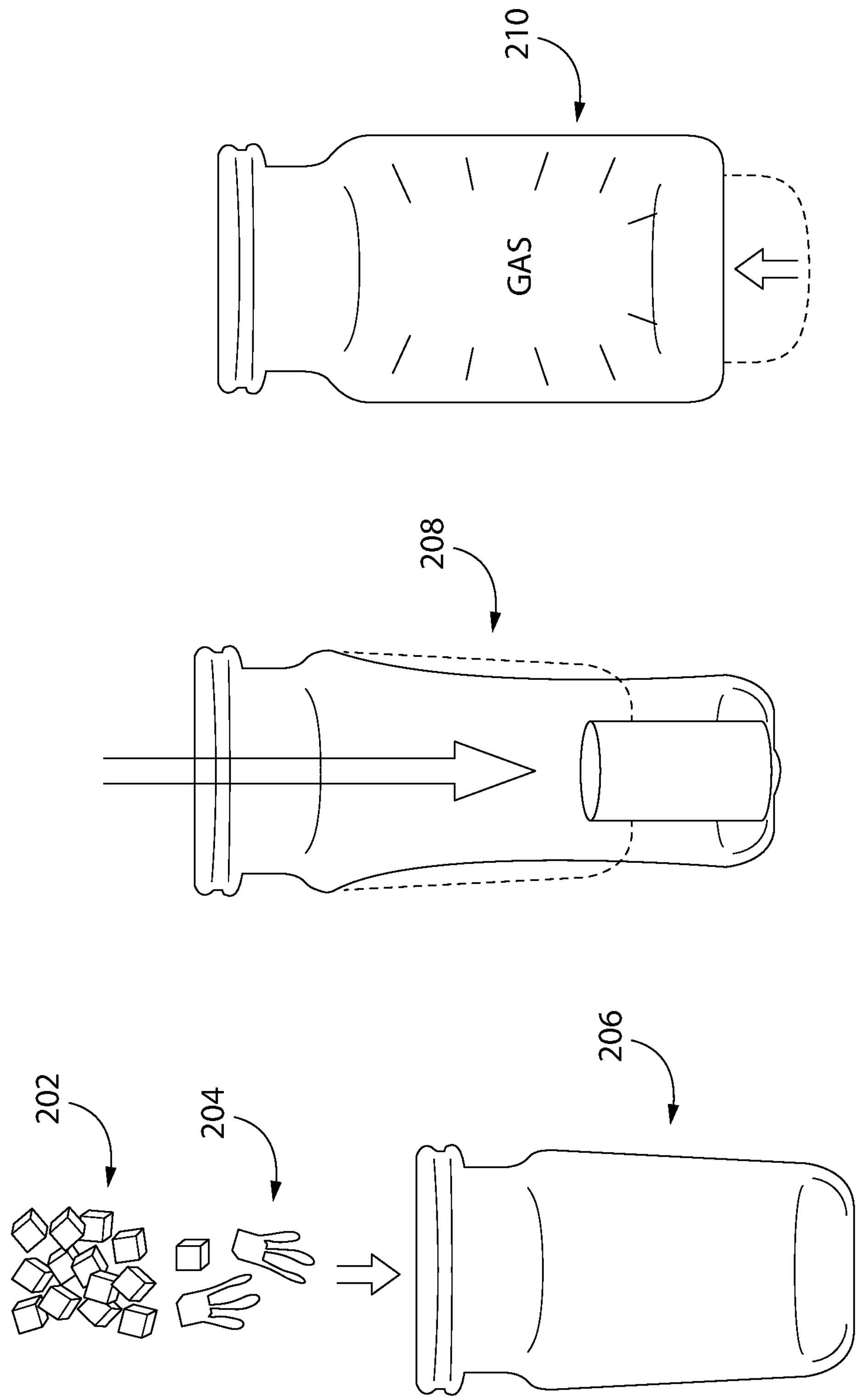
FIGS. 5A-5C show a schematic illustration of the steps involved in injection stretch blow molding a vial in accordance with an optional aspect of the disclosed concept.

FIGS. 5A-5C show a schematic illustration of the steps involved in stretch blow molding according to an aspect of the disclosed concept. It is noted that the final vial shown in FIG. 5C is intended to be merely illustrative of the process and does not precisely and intricately depict all structural features of vial 110. As shown in FIG. 5A, injection stretch blow molding initially involves steps of: providing a plastic resin 202 (e.g., cyclin olefin polymer), melting the resin and delivering the melt to an injection mold 204, and molding a preform 206 from the resin. In a next step 208, as shown in FIG. 5B, the heated preform is stretched optionally within the mold using a mandrel. When in the mold, the preform is stretched past the bottom (i.e., the base mold is not yet in position for blowing such that the mold is not in blow position). In a last step 210, as shown in FIG. 5C, gas is blown into the stretched heated preform while the mold parts and base mold are collectively in blow position (i.e., the base mold is pushed up from its previous position during the stretch step) to form the final shape of the vial. Moving the base mold up in this way after stretching and then blowing gas helps to optimize material distribution, especially in the corners. Blow pressure may be adjusted and controlled during steps 208 and 210. For example, optionally low pressure blow may be utilized during the stretch step 208 to help distribute the material of the preform out. Gas may be blown at high pressure when the base mold is in position, after the desired shape of the vial is partially formed. Optionally, a four component injection mold is used to help optimize the process and result in improved material distribution.

During the stretching step, the mandrel may be controlled pneumatically or by servo. Servo may be preferred because it provides more precise control in stretch speed and position of the mandrel. Also, a servo may optionally be used to monitor plastic temperature and adjust speed profile to help achieve a vial with desirable dimensions and tolerance necessary for thermal efficiency.

Applicant has found that the lower stretch ratio produced using injection stretch blow molding compared to other forms of blow molding enables better control of the part side wall thickness variation. Dimensional control and tolerances of the resulting part can improve the thermal efficiency of the container or vessel (e.g., vial). Minimizing side wall thickness variation facilitates more consistent heat transfer during a freeze drying (lyophilization) cycle. Notably, consistent side wall thickness measured radially (i.e., 360° around a central axis of the vial) appears to be more important than consistency of wall thickness measured axially (i.e., wall thickness at the top of the vial versus that near the bottom). In addition to advantages relating to thermal efficiency, sidewall thickness consistency of a vial produced according to the injection stretch blow molding method of the disclosed concept results in improved optical properties. Such properties in parenteral containers is necessary to permit visual inspection through the clear container for any foreign contamination. Side wall thickness inconsistency can create optical distortion, which limits one's ability to visually inspect the contents of the vial. The methods and vials of the disclosed concept reduce or eliminate this problem of the prior art.

It has further been found that density of the polymer vials made according to the above-noted process is much more consistent and precisely controlled than that of glass vials. Variations in density can affect the cycle time for lyophilization. Thus, the more consistent density of the vials according to the disclosed concept provide improved consistency in the lyophilization process.

Figures 6A, 6B:
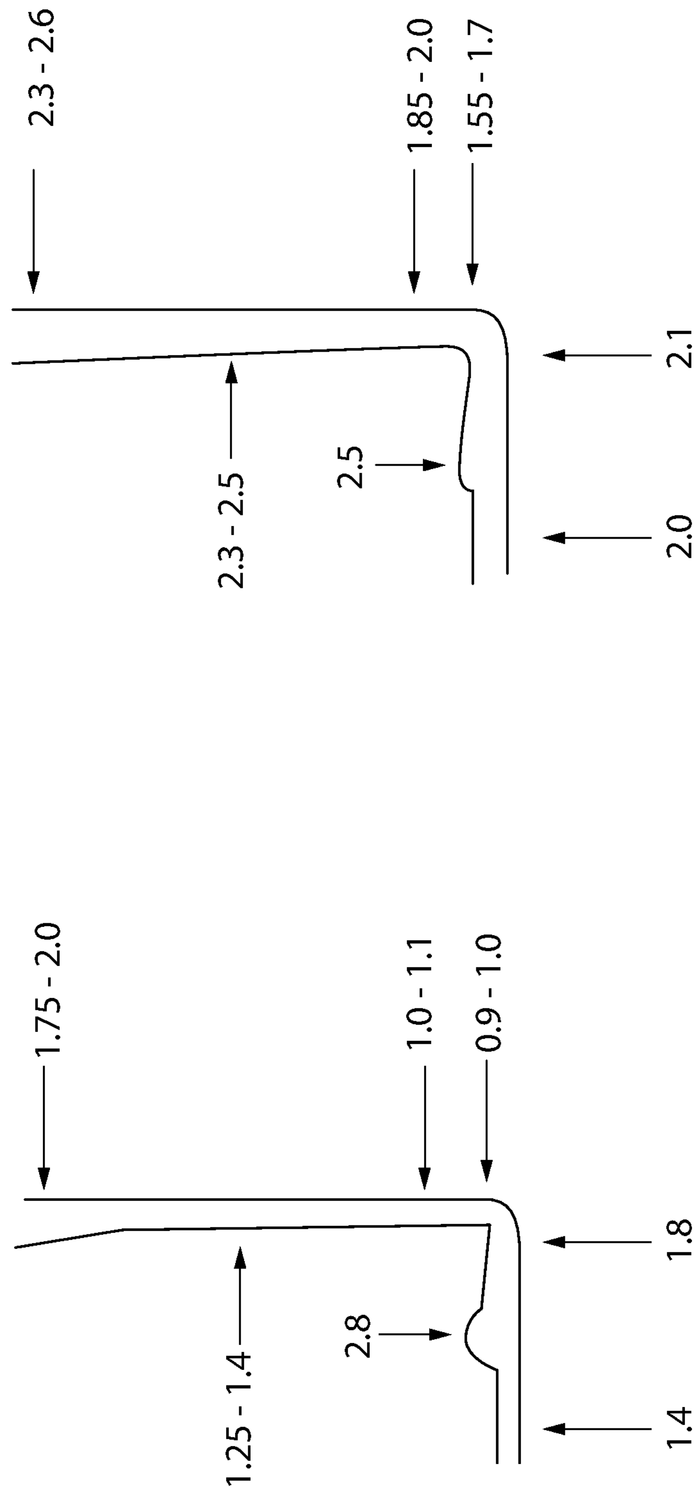
FIG. 6A is a schematic illustration of a bottom-right section of an exemplary 10 mL lyophilization vial according to an optional aspect of the disclosed concept, which shows exemplary dimensions dimensional tolerances of the vial, in mm.
FIG. 6B is a schematic illustration of a bottom-right section of an exemplary 20 mL lyophilization vial according to an optional aspect of the disclosed concept, which shows exemplary dimensions and dimensional tolerances of the vial, in mm.

Referring to FIGS. 6A and 6B, there are respectively shown schematic illustrations of bottom-right sections of exemplary 10 mL (FIG. 6A) and 20 mL (FIG. 6B) lyophilization vials according to optional aspects of the disclosed concept, which show optional dimensions and dimensional tolerances of the vials. The dimensions and ranges shown in the figures are in millimeters. These dimensional tolerances are based on measurements of actual parts produced with injection stretch blow molding methods and equipment according to optional aspects of the disclosed concept. The dimensional contour thickness varies by less than 0.03 mm from part to part. The thickness does vary across the bottom by 0.5 mm on the 20 ml (with preform and process optimized), but the contour is practically the same from part to part. Even with the big thickness differences, the contour of that bottom was consistent from part to part. As stated above, sidewall thickness consistency as measured around the central axis of the container is what Applicant has found to significantly improve thermal efficiency of the vials, especially for lyophilization.

Optional Vial Materials

Optionally, vessels, e.g., vials according to any embodiment of the invention may be made from one or more (e.g., as a composite or blend) injection moldable thermoplastic materials including, but not limited to: an olefin polymer; polypropylene (PP); polyethylene (PE); cyclic olefin copolymer (COC); cyclic olefin polymer (COP); polymethylpentene; polyester; polyethylene terephthalate; polyethylene naphthalate; polybutylene terephthalate (PBT); PVdC (polyvinylidene chloride); polyvinyl chloride (PVC); polycarbonate; polymethylmethacrylate; polylactic acid; polylactic acid; polystyrene; hydrogenated polystyrene; poly(cyclohexylethylene) (PCHE); nylon; polyurethane polyacrylonitrile; polyacrylonitrile (PAN); an ionomeric resin; Surlyn® ionomeric resin. For applications in which clear and glass-like polymers are desired, a cyclic olefin polymer (COP), cyclic olefin copolymer (COC) or polycarbonate may be preferred. Such materials may be manufactured, e.g., by injection molding or injection stretch blow molding, to very tight and precise tolerances (generally much tighter than achievable with glass).

Preferably, the material is an amorphous polymer, such as a cyclic olefin polymer (COP), instead of a crystalline material. Amorphous polymers can be defined as polymers that do not exhibit any crystalline structures in X-ray or electron scattering experiments. They form a broad group of materials, including glassy, brittle and ductile polymers. Amorphous materials have no patterned order between the molecules. Amorphous materials include atactic polymers since the molecular structure does not generally result in crystallization. Examples of these types of plastics are polystyrene, PVC and atactic polypropylene. The presence of polar groups, such as a carbonyl group CO in vinyl type polymers, also restricts crystallization. Polyvinyl acetate, all polyacrylates and polymethylacrylates are examples of carbonyl groups being present and the resulting groups being amorphous. Polyacrylonitrile is an exception to this. Even amorphous materials can have a degree of crystallinity with the formation of crystallites throughout their structure. The degree of crystallinity is an inherent characteristic of each polymer but may also be affected or controlled by processes such as polymerisation and molding.

Crystalline materials exhibit areas of highly organized and tightly packed molecules. These areas of crystallinity are called spherulites and can be varied in shape and size with amorphous areas between the crystallites. The length of polymers contributes to their ability to crystallize as the chains pack closely together, as well as overlapping and aligning the atoms of the molecules in a repeating lattice structure. Polymers with a backbone of carbon and oxygen, such as acetals, readily crystallize. Plastic materials, such as nylon and other polyamides, crystallize due to the parallel chains and strong hydrogen bonds of the carbonyl and amine groups. Polyethylene is crystalline because the chains are highly regular and easily aligned. Polytetrafluoroethylene (PTFE) is also highly symmetric with fluorine atoms replacing all the hydrogens along the carbon backbone. It, too, is highly crystalline. Isomer structures also affect the degree of crystallinity.

As the atactic stereochemistry results in amorphous polymers, those that are isotactic and syndiotactic result in crystalline structures, forming as chains align to form crystallites. These stereospecific forms or propylene are those which are preferable for structural applications due to their degree of crystallinity. The degree of crystallinity affects many polymeric properties. In turn, other characteristics and processes affect the degree of crystallinity. The higher the molecular weight, the lower the degree of crystallinity and the areas of the crystallites are more imperfect. The degree of crystallinity also depends on the time available for crystallization to occur. Processors can use this time to their advantage by quenching or annealing to control the time for crystallization to occur. Highly branched polymers tend to have lower degrees of crystallinity, as is easily seen in the difference between branched low-density polyethylene (LDPE) and the more crystalline high-density polyethylene (HDPE). LDPE is more flexible, less dense and more transparent than HDPE. This is an excellent example that the same polymer can have varied degrees of crystallinity. Stress can also result in crystallinity as polymer chains align orienting the crystallites. Drawing fibers, the direction of extrusion and gate placements will also affect the orientation of polymers and therefore the crystallites of the material. This allows the processor to maximize the effects and benefits of the inherent crystallinity of the polymer being used in the application. Amorphous polymers have inherent characteristics desirable for the process, methods, and resulting vessels or containers of the disclosed concept, including natural heat tolerance and molding capacity, and good water barrier from or through the material.

PECVD Coating Layers

As discussed above, use of uncoated polymer vials for lyophilization may be limited due to insufficient barrier properties of the polymer material alone.

Accordingly, in another aspect, the disclosed concept optionally includes use of any embodiments (or combination of embodiments) of vials according to the disclosed concept having a PECVD coating or PECVD coating set. The vials may be made from, e.g., a thermoplastic material. Optionally, the vial according to any embodiment is made from an injection moldable thermoplastic material as defined above, in particular a material that appears clear and glass-like in final form, e.g., a cyclic olefin polymer (COP), cyclic olefin copolymer (COC) or polycarbonate. Such materials may be manufactured, e.g., by injection molding, to very tight and precise tolerances (generally much tighter than achievable with glass). This is a benefit when trying to balance the competing considerations of seal tightness and low plunger force in plunger design.

For some applications, it may be desired to provide one or more coatings or layers to the interior wall of a parenteral container to modify the properties of that container. For example, one or more coatings or layers may be added to a parenteral container, e.g., to improve the barrier properties of the container and prevent interaction between the container wall (or an underlying coating) and drug product held within the container. Such coatings or layers may be constructed in accordance with the teachings of PCT/US2014/023813, which is incorporated by reference herein in its entirety. Preferred methods of applying one or more of a barrier layer and underlying tie layer to the inner surface of a vessel (e.g., vial) is by plasma enhanced chemical vapor deposition (PECVD), such as described in, e.g., U.S. Pat. App. Pub. No. 20130291632, U.S. Pat. No. 7,985,188, and/or PCT/US2016/047622, each of which is incorporated by reference herein in its entirety.

Tri-Layer Coating Set

Optionally, in any embodiment the inner surface of a vial according to an aspect of the disclosed concept may include a coating set comprising one or more coatings or layers. The vial may optionally include at least one tie coating or layer, at least one barrier coating or layer, and at least one organo-siloxane coating or layer. The organo-siloxane coating or layer preferably has pH protective properties. This embodiment of the coating set is referred to herein as a "tri-layer coating set" in which the barrier coating or layer is protected against contents having a pH otherwise high enough to remove it by being sandwiched between the pH protective organo-siloxane coating or layer and the tie coating or layer. The contemplated thicknesses of the respective layers in nanometers (preferred ranges in parentheses) are given in the following Tri-layer Thickness Table:

TABLE 1

| Tri-layer Thickness | | |
|---|---|---|
| Adhesion (nm) | Barrier (nm) | Protection (nm) |
| 5-100<br>(5-20) | 20-200<br>(20-30) | 50-500<br>(100-200) |

Properties, compositions and methods for generating of each of the coatings that make up the tri-layer coating set are described in U.S. Pat. No. 9,937,099, which is incorporated-by-reference herein in its entirety.

The tie coating or layer has at least two functions. One function of the tie coating or layer is to improve adhesion of a barrier coating or layer to a substrate (e.g., the inner surface of the vial), in particular a thermoplastic substrate, although a tie layer can be used to improve adhesion to a glass substrate or to another coating or layer. For example, a tie coating or layer, also referred to as an adhesion layer or coating can be applied to the substrate and the barrier layer can be applied to the adhesion layer to improve adhesion of the barrier layer or coating to the substrate.

Another function of the tie coating or layer has been discovered: a tie coating or layer applied under a barrier coating or layer can improve the function of a pH protective organo-siloxane coating or layer applied over the barrier coating or layer.

The tie coating or layer can be composed of, comprise, or consist essentially of SiOxCy, in which x is between 0.5 and 2.4 and y is between 0.6 and 3. Alternatively, the atomic ratio can be expressed as the formula SiwOxCy. The atomic ratios of Si, O, and C in the tie coating or layer are, as several options:

- Si 100:O 50-150:C 90-200 (i.e. w=1, x=0.5 to 1.5, y=0.9 to 2);
- Si 100:O 70-130:C 90-200 (i.e. w=1, x=0.7 to 1.3, y=0.9 to 2)
- Si 100:O 80-120:C 90-150 (i.e. w=1, x=0.8 to 1.2, y=0.9 to 1.5)
- Si 100:O 90-120:C 90-140 (i.e. w=1, x=0.9 to 1.2, y=0.9 to 1.4), or
- Si 100:O 92-107:C 116-133 (i.e. w=1, x=0.92 to 1.07, y=1.16 to 1.33).

The atomic ratio can be determined by XPS. Taking into account the H atoms, which are not measured by XPS, the tie coating or layer may thus in one aspect have the formula SiwOxCyHz (or its equivalent SiOxCy), for example where w is 1, x is from about 0.5 to about 2.4, y is from about 0.6 to about 3, and z is from about 2 to about 9. Typically, a tie coating or layer would hence contain 36% to 41% carbon normalized to 100% carbon plus oxygen plus silicon.

The barrier coating or layer for any embodiment defined in this specification (unless otherwise specified in a particular instance) is a coating or layer, optionally applied by PECVD as indicated in U.S. Pat. No. 7,985,188. The barrier coating preferably is characterized as a "SiOx" coating, in which x, the ratio of oxygen to silicon atoms, is from about 1.5 to about 2.9. The thickness of the SiOx or other barrier coating or layer can be measured, for example, by transmission electron microscopy (TEM), and its composition can be measured by X-ray photoelectron spectroscopy (XPS). The barrier layer is effective to prevent oxygen, carbon dioxide, water vapor, or other gases (e.g. residual monomers of the polymer from which the container wall is made) from entering the container and/or to prevent leaching of the pharmaceutical material into or through the container wall.

The Applicant has found that barrier layers or coatings of SiOx are eroded or dissolved by some fluids, for example aqueous compositions having a pH above about 5. Since coatings applied by chemical vapor deposition can be very thin—tens to hundreds of nanometers thick—even a relatively slow rate of erosion can remove or reduce the effectiveness of the barrier layer in less time than the desired shelf life of a product package. This is particularly a problem for fluid pharmaceutical compositions, since many of them have a pH of roughly 7, or more broadly in the range of 5 to 9, similar to the pH of blood and other human or animal fluids. The higher the pH of the pharmaceutical preparation, the more quickly it erodes or dissolves the SiOx coating. Optionally, this problem can be addressed by protecting the barrier coating or layer, or other pH sensitive material, with a pH protective organo-siloxane coating or layer.

Optionally, the pH protective coating or layer can be composed of, comprise, or consist essentially of SiwOxCyHz (or its equivalent SiOxCy) or SiwNxCyHz or its equivalent SiNxCy). The atomic ratio of Si:O:C or Si:N:C can be determined by XPS (X-ray photoelectron spectroscopy). Taking into account the H atoms, the pH protective coating or layer may thus in one aspect have the formula SiwOxCyHz, or its equivalent SiOxCy, for example where w is 1, x is from about 0.5 to about 2.4, y is from about 0.6 to about 3, and z is from about 2 to about 9.

Typically, expressed as the formula SiwOxCy, the atomic ratios of Si, O, and C are, as several options:

- Si 100:O 50-150:C 90-200 (i.e. w=1, x=0.5 to 1.5, y=0.9 to 2);
- Si 100:O 70-130:C 90-200 (i.e. w=1, x=0.7 to 1.3, y=0.9 to 2)
- Si 100:O 80-120:C 90-150 (i.e. w=1, x=0.8 to 1.2, y=0.9 to 1.5)
- Si 100:O 90-120:C 90-140 (i.e. w=1, x=0.9 to 1.2, y=0.9 to 1.4)
- Si 100:O 92-107:C 116-133 (i.e. w=1, x=0.92 to 1.07, y=1.16 to 1.33), or

- Si 100:O 80-130:C 90-150.

Alternatively, the organo-siloxane coating or layer can have atomic concentrations normalized to 100% carbon, oxygen, and silicon, as determined by X-ray photoelectron spectroscopy (XPS) of less than 50% carbon and more than 25% silicon. Alternatively, the atomic concentrations are from 25 to 45% carbon, 25 to 65% silicon, and 10 to 35% oxygen. Alternatively, the atomic concentrations are from 30 to 40% carbon, 32 to 52% silicon, and 20 to 27% oxygen. Alternatively, the atomic concentrations are from 33 to 37% carbon, 37 to 47% silicon, and 22 to 26% oxygen.

Optionally, the atomic concentration of carbon in the pH protective coating or layer, normalized to 100% of carbon, oxygen, and silicon, as determined by X-ray photoelectron spectroscopy (XPS), can be greater than the atomic concentration of carbon in the atomic formula for the organosilicon precursor. For example, embodiments are contemplated in which the atomic concentration of carbon increases by from 1 to 80 atomic percent, alternatively from 10 to 70 atomic percent, alternatively from 20 to 60 atomic percent, alternatively from 30 to 50 atomic percent, alternatively from 35 to 45 atomic percent, alternatively from 37 to 41 atomic percent.

Optionally, the atomic ratio of carbon to oxygen in the pH protective coating or layer can be increased in comparison to the organosilicon precursor, and/or the atomic ratio of oxygen to silicon can be decreased in comparison to the organosilicon precursor.

An exemplary empirical composition for a pH protective coating according to an optional embodiment is $SiO_{1.3}C_{0.8}H_{3.6}$.

Optionally in any embodiment, the pH protective coating or layer comprises, consists essentially of, or consists of PECVD applied coating.

Optionally in any embodiment, the pH protective coating or layer is applied by employing a precursor comprising, consisting essentially of, or consisting of a silane. Optionally in any embodiment, the silane precursor comprises, consists essentially of, or consists of any one or more of an acyclic or cyclic silane, optionally comprising, consisting essentially of, or consisting of any one or more of silane, trimethylsilane, tetramethylsilane, Si2-Si4 silanes, triethyl silane, tetraethyl silane, tetrapropylsilane, tetrabutylsilane, or octamethylcyclotetrasilane, or tetramethylcyclotetrasilane.

Optionally in any embodiment, the pH protective coating or layer comprises, consists essentially of, or consists of PECVD applied amorphous or diamond-like carbon. Optionally in any embodiment, the amorphous or diamond-like carbon is applied using a hydrocarbon precursor. Optionally in any embodiment, the hydrocarbon precursor comprises, consists essentially of, or consists of a linear, branched, or cyclic alkane, alkene, alkadiene, or alkyne that is saturated or unsaturated, for example acetylene, methane, ethane, ethylene, propane, propylene, n-butane, i-butane, butane, propyne, butyne, cyclopropane, cyclobutane, cyclohexane, cyclohexene, cyclopentadiene, or a combination of two or more of these. Optionally in any embodiment, the amorphous or diamond-like carbon coating has a hydrogen atomic percent of from 0.1% to 40%, alternatively from 0.5% to 10%, alternatively from 1% to 2%, alternatively from 1.1 to 1.8%

Optionally in any embodiment, the pH protective coating or layer comprises, consists essentially of, or consists of PECVD applied SiN. Optionally in any embodiment, the PECVD applied SiN is applied using a silane and a nitrogen-containing compound as precursors. Optionally in any embodiment, the silane is an acyclic or cyclic silane, optionally comprising, consisting essentially of, or consisting of silane, trimethylsilane, tetramethylsilane, Si2-Si4 silanes, triethylsilane, tetraethylsilane, tetrapropylsilane, tetrabutylsilane, octamethylcyclotetrasilane, or a combination of two or more of these. Optionally in any embodiment, the nitrogen-containing compound comprises, consists essentially of, or consists of any one or more of: nitrogen gas, nitrous oxide, ammonia or a silazane. Optionally in any embodiment, the silazane comprises, consists essentially of, or consists of a linear silazane, for example hexamethylene disilazane (HMDZ), a monocyclic silazane, a polycyclic silazane, a polysilsesquiazane, or a combination of two or more of these.

Optionally in any embodiment, the PECVD for the pH protective coating or layer is carried out in the substantial absence or complete absence of an oxidizing gas. Optionally in any embodiment, the PECVD for the pH protective coating or layer is carried out in the substantial absence or complete absence of a carrier gas.

Optionally an FTIR absorbance spectrum of the pH protective coating or layer SiOxCyHz has a ratio greater than 0.75 between the maximum amplitude of the Si—O—Si symmetrical stretch peak normally located between about 1000 and 1040 cm-1, and the maximum amplitude of the Si—O—Si asymmetric stretch peak normally located between about 1060 and about 1100 cm-1. Alternatively in any embodiment, this ratio can be at least 0.8, or at least 0.9, or at least 1.0, or at least 1.1, or at least 1.2. Alternatively in any embodiment, this ratio can be at most 1.7, or at most 1.6, or at most 1.5, or at most 1.4, or at most 1.3. Any minimum ratio stated here can be combined with any maximum ratio stated here, as an alternative embodiment.

Optionally, in any embodiment the pH protective coating or layer, in the absence of the liquid filling, has a non-oily appearance. This appearance has been observed in some instances to distinguish an effective pH protective coating or layer from a lubricity layer (e.g., as described in U.S. Pat. No. 7,985,188), which in some instances has been observed to have an oily (i.e. shiny) appearance.

The pH protective coating or layer optionally can be applied by plasma enhanced chemical vapor deposition (PECVD) of a precursor feed comprising an acyclic siloxane, a monocyclic siloxane, a polycyclic siloxane, a polysilsesquioxane, a monocyclic silazane, a polycyclic silazane, a polysilsesquiazane, a silatrane, a silquasilatrane, a silproatrane, an azasilatrane, an azasilquasiatrane, an azasilproatrane, or a combination of any two or more of these precursors. Some particular, non-limiting precursors contemplated for such use include octamethylcyclotetrasiloxane (OMCTS).

Other precursors and methods can be used to apply the pH protective coating or layer or passivating treatment. For example, hexamethylene disilazane (HMDZ) can be used as the precursor. HMDZ has the advantage of containing no oxygen in its molecular structure. This passivation treatment is contemplated to be a surface treatment of the SiOx barrier layer with HMDZ. To slow down and/or eliminate the decomposition of the silicon dioxide coatings at silanol bonding sites, the coating must be passivated. It is contemplated that passivation of the surface with HMDZ (and optionally application of a few mono layers of the HMDZ-derived coating) will result in a toughening of the surface against dissolution, resulting in reduced decomposition. It is contemplated that HMDZ will react with the —OH sites that are present in the silicon dioxide coating, resulting in the evolution of $NH_3$ and bonding of S—$(CH_3)_3$ to the silicon (it is contemplated that hydrogen atoms will be evolved and bond with nitrogen from the HMDZ to produce $NH_3$).

Another way of applying the pH protective coating or layer is to apply as the pH protective coating or layer an amorphous carbon or fluorocarbon coating, or a combination of the two.

Amorphous carbon coatings can be formed by PECVD using a saturated hydrocarbon, (e.g. methane or propane) or an unsaturated hydrocarbon (e.g. ethylene, acetylene) as a precursor for plasma polymerization. Fluorocarbon coatings can be derived from fluorocarbons (for example, hexafluoroethylene or tetrafluoroethylene). Either type of coating, or a combination of both, can be deposited by vacuum PECVD or atmospheric pressure PECVD. It is contemplated that that an amorphous carbon and/or fluorocarbon coating will provide better passivation of an SiOx barrier layer than a siloxane coating since an amorphous carbon and/or fluorocarbon coating will not contain silanol bonds.

It is further contemplated that fluorosilicon precursors can be used to provide a pH protective coating or layer over a SiOx barrier layer. This can be carried out by using as a precursor a fluorinated silane precursor such as hexafluorosilane and a PECVD process. The resulting coating would also be expected to be a non-wetting coating.

Yet another coating modality contemplated for protecting or passivating a SiOx barrier layer is coating the barrier layer using a polyamidoamine epichlorohydrin resin. For example, the barrier coated part can be dip coated in a fluid polyamidoamine epichlorohydrin resin melt, solution or dispersion and cured by autoclaving or other heating at a temperature between 60 and 100° C. It is contemplated that a coating of polyamidoamine epichlorohydrin resin can be preferentially used in aqueous environments between pH 5-8, as such resins are known to provide high wet strength in paper in that pH range. Wet strength is the ability to maintain mechanical strength of paper subjected to complete water soaking for extended periods of time, so it is contemplated that a coating of polyamidoamine epichlorohydrin resin on a SiOx barrier layer will have similar resistance to dissolution in aqueous media. It is also contemplated that, because polyamidoamine epichlorohydrin resin imparts a lubricity improvement to paper, it will also provide lubricity in the form of a coating on a thermoplastic surface made of, for example, COC or COP.

Even another approach for protecting a SiOx layer is to apply as a pH protective coating or layer a liquid-applied coating of a polyfluoroalkyl ether, followed by atmospheric plasma curing the pH protective coating or layer. For example, it is contemplated that the process practiced under the trademark TriboGlide® can be used to provide a pH protective coating or layer that also provides lubricity.

Thus, a pH protective coating for a thermoplastic vessel wall according to an aspect of the invention may comprise, consist essentially of, or consist of any one of the following: plasma enhanced chemical vapor deposition (PECVD) applied coating having the formula SiOxCyHz, in which x is from 0 to 0.5, alternatively from 0 to 0.49, alternatively from 0 to 0.25 as measured by X ray photoelectron spectroscopy (XPS), y is from about 0.5 to about 1.5, alternatively from about 0.8 to about 1.2, alternatively about 1, as measured by XPS, and z is from 0 to 2 as measured by Rutherford Backscattering Spectrometry (RBS), alternatively by Hydrogen Forward Scattering Spectrometry (HFS); or PECVD applied amorphous or diamond-like carbon, $CH_z$, in which z is from 0 to 0.7, alternatively from 0.005 to 0.1, alternatively from 0.01 to 0.02; or PECVD applied $SiN_b$, in which b is from about 0.5 to about 2.1, alternatively from about 0.9 to about 1.6, alternatively from about 1.2 to about 1.4, as measured by XPS.

Optionally, in any embodiment, a top surface treatment or coating is applied atop the pH protective layer to optimize the compatibility of the vial surface with specific drugs. Such surface treatment or coating eliminates liquid hang-up on the vial walls that may cause small amounts of the drug to be lyophilized on the wall, which is unattractive and may result in rejected product.

PECVD Apparatus

PECVD apparatus suitable for applying any of the PECVD coatings or layers described in this specification, including the tie coating or layer, the barrier coating or layer or the organo-siloxane coating or layer, are shown and described in U.S. Pat. No. 7,985,188 and U.S. Pat. App. Pub. No. 20130291632. This apparatus optionally includes a vessel holder, an inner electrode, an outer electrode, and a power supply. A vessel seated on the vessel holder defines a plasma reaction chamber, optionally serving as its own vacuum chamber. Optionally, a source of vacuum, a reactant gas source, a gas feed or a combination of two or more of these can be supplied. Optionally, a gas drain, not necessarily including a source of vacuum, is provided to transfer gas to or from the interior of a vessel seated on the port to define a closed chamber. Additional details of optional PECVD apparatus and use of the same to apply coatings follows, with reference to FIG. 7.

A PECVD apparatus or coating station 1060 suitable for the present purpose includes a vessel holder 1050, an inner electrode defined by the probe 1108, an outer electrode 1160, and a power supply 1162. The pre-assembly 1012 seated on the vessel holder 1050 defines a plasma reaction chamber, which optionally can be a vacuum chamber. Optionally, a source of vacuum 1098, a reactant gas source 1144, a gas feed (probe 1108) or a combination of two or more of these can be supplied.

The PECVD apparatus can be used for atmospheric-pressure PECVD, in which case the plasma reaction chamber defined by the pre-assembly 1012 does not need to function as a vacuum chamber.

The vessel holder 1050 comprises a gas inlet port for conveying a gas into the pre-assembly 1012 seated on the opening. The gas inlet port can have a sliding seal provided for example by at least one O-ring, or two O-rings in series, or three O-rings in series, which can seat against a cylindrical probe 1108 when the probe 1108 is inserted through the gas inlet port. The probe 1108 can be a gas inlet conduit that extends to a gas delivery port at its distal end 1110. The distal end 1110 of the illustrated embodiment can be inserted at an appropriate depth in the pre-assembly 1012 for providing one or more PECVD reactants and other precursor feed or process gases.

Figure 7:
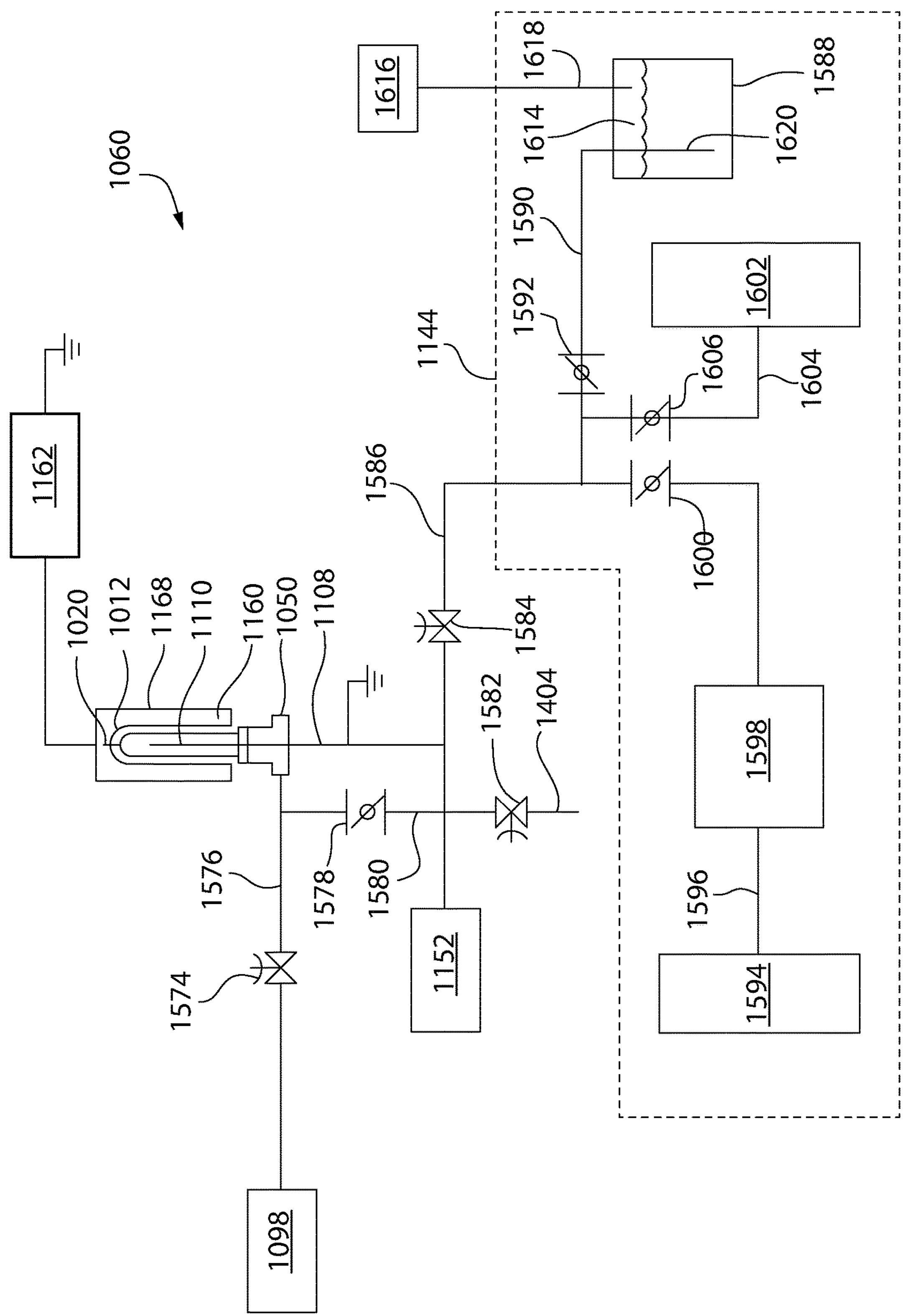
FIG. 7 shows a schematic diagram of a PECVD apparatus that may be used to apply PECVD layers, e.g., surface barrier coatings or layers and/or protective or passivation coatings or layers, in accordance with at least one optional aspect of the disclosed concept.

FIG. 7 shows additional optional details of the coating station 1060 that are usable, for example, with all the illustrated embodiments. The coating station 1060 can also have a main vacuum valve 1574 in its vacuum line 1576 leading to the pressure sensor 1152. A manual bypass valve 1578 can be provided in the bypass line 1580. A vent valve 1582 controls flow at the vent 1404.

Flow out of the PECVD gas or precursor source 1144 can be controlled by a main reactant gas valve 1584 regulating flow through the main reactant feed line 1586. One component of the gas source 1144 can be the organosilicon liquid reservoir 1588, containing the precursor. The contents of the reservoir 1588 can be drawn through the organosilicon capillary line 1590, which optionally can be provided at a suitable length to provide the desired flow rate. Flow of organosilicon vapor can be controlled by the organosilicon shut-off valve 1592. Pressure can be applied to the headspace 1614 of the liquid reservoir 1588, for example a pressure in the range of 0-15 psi (0 to 78 cm. Hg), from a pressure source 1616 such as pressurized air connected to the headspace 1614 by a pressure line 1618 to establish repeatable organosilicon liquid delivery that is not dependent on atmospheric pressure (and the fluctuations therein). The reservoir 1588 can be sealed and the capillary connection 1620 can be at the bottom of the reservoir 1588 to ensure that only neat organosilicon liquid (not the pressurized gas from the headspace 1614) flows through the capillary tube 1590. The organosilicon liquid optionally can be heated above ambient temperature, if necessary or desirable to cause the organosilicon liquid to evaporate, forming an organosilicon vapor. To accomplish this heating, the apparatus can advantageously include heated delivery lines from the exit of the precursor reservoir to as close as possible to the gas inlet into the vessel. Preheating can be useful, for example, when feeding OMCTS.

Oxidant gas can be provided from the oxidant gas tank 1594 via an oxidant gas feed line 1596 controlled by a mass flow controller 1598 and provided with an oxidant shut-off valve 1600.

Optionally in any embodiment, other precursor, oxidant, and/or carrier gas reservoirs such as 1602 can be provided to supply additional materials if needed for a particular deposition process. Each such reservoir such as 1602 can have an appropriate feed line 1604 and shut-off valve 1606.

The processing station 1060 can include an electrode 1160 fed by a radio frequency power supply 1162 for providing an electric field for generating plasma within the pre-assembly 1012 during processing. In this embodiment, the probe 1108 can be electrically conductive and can be grounded, thus providing a counter-electrode within the pre-assembly 1012. Alternatively, in any embodiment the outer electrode 1160 can be grounded and the probe 1108 can be directly connected to the power supply 1162.

The outer electrode 1160 can either be generally cylindrical or a generally U-shaped elongated channel. Each embodiment can have one or more sidewalls and optionally a top end 1168, disposed about the pre-assembly 1012 in close proximity.

Accordingly, in one optional aspect, the invention may incorporate an organo-siloxane coating on the inner surface of a container which may, for example, be any embodiment of the pH protective coating discussed above. The organo-siloxane coating may be applied directly to the interior wall of the container or as a top layer on a multi-layer coating set, e.g., the tri-layer coating set discussed above.

The organo-siloxane coating can optionally provide multiple functions: (1) a pH resistant layer that protects an underlying layer or underlying polymer substrate from drug products having a pH from 4-10, optionally from 5-9; (2) a drug contact surface that minimizes aggregation, extractables and leaching; and (3) in the case of a protein-based drug, reduced protein binding on the container surface.

In one embodiment, the tie or adhesion coating or layer and the barrier coating or layer, and optionally the pH protective layer, are applied in the same apparatus, without breaking vacuum between the application of the adhesion coating or layer and the barrier coating or layer or, optionally, between the barrier coating or layer and the pH protective coating or layer. During the process, a partial vacuum is drawn in the lumen. While maintaining the partial vacuum unbroken in the lumen, a tie coating or layer of SiOxCy is applied by a tie PECVD coating process. The tie PECVD coating process is carried out by applying sufficient power to generate plasma within the lumen while feeding a gas suitable for forming the coating. The gas feed includes a linear siloxane precursor, optionally oxygen, and optionally an inert gas diluent. The values of x and y are as determined by X-ray photoelectron spectroscopy (XPS). Then, while maintaining the partial vacuum unbroken in the lumen, the plasma is extinguished. A tie coating or layer of SiOxCy, for which x is from about 0.5 to about 2.4 and y is from about 0.6 to about 3, is produced on the inside surface as a result.

Later during the process, while maintaining the partial vacuum unbroken in the lumen, a barrier coating or layer is applied by a barrier PECVD coating process. The barrier PECVD coating process is carried out by applying sufficient power to generate plasma within the lumen while feeding a gas. The gas feed includes a linear siloxane precursor and oxygen. A barrier coating or layer of SiOx, wherein x is from 1.5 to 2.9 as determined by XPS is produced between the tie coating or layer and the lumen as a result.

Then optionally, while maintaining the partial vacuum unbroken in the lumen, the plasma is extinguished.

Later, as a further option, a pH protective coating or layer of SiOxCy can be applied. In this formula as well, x is from about 0.5 to about 2.4 and y is from about 0.6 to about 3, each as determined by XPS. The pH protective coating or layer is optionally applied between the barrier coating or layer and the lumen, by a pH protective PECVD coating process. This process includes applying sufficient power to generate plasma within the lumen while feeding a gas including a linear siloxane precursor, optionally oxygen, and optionally an inert gas diluent.

Then optionally, while maintaining the partial vacuum unbroken in the lumen, the plasma is extinguished.

Later, as a further option, a lubricity coating or layer of SiOxCy can be applied. In this formula as well, x is from about 0.5 to about 2.4 and y is from about 0.6 to about 3, each as determined by XPS. The lubricity coating or layer is optionally applied on top of the pH protective coating, by a lubricity PECVD coating process. This process includes applying sufficient power to generate plasma within the lumen while feeding a gas including an organo siloxane precursor, optionally oxygen, and optionally an inert gas diluent.

Optionally in any embodiment, the PECVD process for applying the tie coating or layer, the barrier coating or layer, and/or the pH protective coating or layer, and/or the lubricty coating or any combination of two or more of these, is carried out by applying pulsed power (alternatively the same concept is referred to in this specification as "energy") to generate plasma within the lumen.

Alternatively, the tie PECVD coating process, or the barrier PECVD coating process, or the pH protective PECVD coating process, or any combination of two or more of these, can be carried out by applying continuous power to generate plasma within the lumen.

The trilayer coating as described in this embodiment is applied by adjusting the flows of a single organosilicon monomer (HMDSO) and oxygen and also varying the PECVD generating power between each layer (without breaking vacuum between any two layers).

The vessel (e.g., a COC or COP vial) is placed on a vessel holder, sealed, and a vacuum is pulled within the vessel. After pulling vacuum, the gas feed of precursor, oxygen, and argon is introduced, then at the end of the "plasma delay" continuous (i.e. not pulsed) RF power at 13.56 MHz is turned on to form the tie coating or layer. Then power is turned off, gas flows are adjusted, and after the plasma delay power is turned on for the second layer—an SiOx barrier coating or layer. This is then repeated for a third layer before the gases are cut off, the vacuum seal is broken, and the vessel is removed from the vessel holder. The layers are put down in the order of Tie then Barrier then pH Protective. An exemplary process settings are as shown in the following table:

TABLE 2

| Coating | $O_2$ (sccm) | Ar (sccm) | HMDSO (sccm) | Power (W) | Deposition Time (sec) |
|---|---|---|---|---|---|
| Tie | 1 | 40 | 2 | 20 | 2.5 |
| Barrier | 100 | 0 | 1 | 60 | 15 |
| pH Protective | 1 | 40 | 2 | 20 | 10 |

As a still a still further alternative, pulsed power can be used for some steps, and continuous power can be used for others. For example, when preparing a trilayer coating or layer composed of a tie coating or layer, a barrier coating or layer, and a pH protective coating or layer, an option specifically contemplated for the tie PECVD coating process and for the pH protective PECVD coating process is pulsed power, and an option contemplated for the corresponding barrier layer is using continuous power to generate plasma within the lumen.

PECVD Water Barrier Coating or Layer

Optionally, in any embodiment, the vial may include deposited thereon a PECVD water barrier coating or layer, as described in Applicant's WO 2019/191269, which is incorporated by reference herein in its entirety. Such a water barrier layer is particularly helpful to provide necessary barrier properties for vials made from cyclic olefin copolymers (COC) or cyclic olefin polymers (COP). COC and COP are amorphous polyolefins, so they are transparent. While COP/COC generally have good water barrier properties for thermoplastics, they may not have sufficient water barrier properties for storing lyophilized drugs, which are supersensitive to moisture.

Optionally, in any embodiment, the vial may include a PECVD water barrier layer in addition to or as an alternative to the above-described tri-layer coating set. Optionally, in any embodiment, the vial may include a PECVD water barrier layer in addition to any one or more of the individual layers of the above-described tri-layer coating set.

The PECVD water barrier layer has a water contact angle from 80 to 180 degrees, optionally from larger than 80 degrees to less than 180 degrees, optionally from 90 degrees to 160 degrees, optionally from 100 degrees to 150 degrees, optionally from 110 degrees to 150 degrees, applied to a surface of the vial using a water barrier coating or layer precursor. The precursor comprises as least one of a saturated or unsaturated, linear or cyclic aliphatic fluorocarbon precursor having from 1 to 10, optionally 1 to 6, optionally 2 to 6 carbon atoms and from 4 to 20 fluorine atoms per molecule, optionally hexafluropropylene ($C_3F_6$), octafluorocyclobutane ($C_4F_8$), tetrafluoroethylene ($C_2F_4$), hexafluoroethane ($C_2F_6$), hexafluoropropylene ($C_3F_6$), octafluorocyclobutane ($C_4F_8$), perfluorohexane ($C_6F_{14}$), perfluoro-2-methyl-2-pentene ($C_6F_{12}$). The precursor further comprises a saturated or unsaturated hydrocarbon having from 1 to 6 carbon atoms, for example lower alkanes having from 1 to 4 carbon atoms, alkenes or alkynes having from 2 to 4 carbon atoms, for example acetylene ($C_2H_2$) or methane ($CH_4$), optionally acetylene ($C_2H_2$), a saturated or unsaturated hydrofluorocarbon having from 1 to 6 carbon atoms; or any combination thereof.

Optionally, in any embodiment, the water barrier layer is between the tri-layer coating and the interior surface of the vessel wall. Optionally, in any embodiment, the water barrier layer is deposited directly to the polymer interior surface of the vessel or vial.

An optional method for applying the water barrier layer and optionally additional coatings (e.g., tie layer, barrier layer and/or pH protective layer) is now described. The method includes at least partially evacuating a region adjacent to a surface of the vessel wall, forming a partially evacuated region. The method further includes feeding the water barrier coating or layer precursor to the partially evacuated region and generating a plasma in the partially evacuated region, forming a water barrier layer supported by the wall adjacent to the evacuated region. The method further includes, before or after the step of feeding the water barrier layer precursor, feeding a precursor gas for a first coating or layer of the tri-layer coating set to the partially evacuated region and generating plasma in the partially evacuated region, forming a coating or layer of the tri-layer coating set supported by the wall adjacent to the evacuated region. Optionally, the method further includes, after feeding a precursor gas for a first coating of the tri-layer coating set, feeding a precursor gas for a second coating of the tri-layer coating set to the partially evacuated region and generating plasma in the partially evacuated region, forming a second coating or layer of the gas barrier coating set supported by the wall adjacent to the evacuated region. Optionally, between at least two or three of the feeding steps, the vacuum in the evacuated region is not broken.

Optionally, the water barrier coating or layer is from 1 nm to 500 nm thick, optionally from 1 nm to 300 nm thick, optionally from 1 nm to 100 nm thick, optionally from 10 nm to 300 nm thick, optionally from 50 nm to 300 nm thick, optionally from 50 nm to 200 nm thick.

Optionally, in any embodiment, the water barrier coating or layer is in direct contact with the vessel (or vial) wall, optionally the inner surface and/or outer surface of the wall.

Optionally, in any embodiment, the water barrier coating or layer is deposited atop a tri-layer coating set on an interior surface of the vial. Optionally, in any embodiment, the tri-layer coating set is deposited atop the water barrier coating or layer on an interior surface of the vial. Optionally, in any embodiment, the vial includes a water barrier layer with no tri-layer coating set. Optionally, in any embodiment, the vial includes a tri-layer coating set with no water barrier layer.

Optionally, for the water barrier coating applied using fluorocarbons as the precursors, the typical coating process conditions are as follows:

Power frequency 13.56 MHz;
Precursor: Hexafluoropropylene ($C_3F_6$) or Octafluorocyclobutane ($C_4F_8$);
Gas flow rate: 5-10 sccm;
Carrier gas flow rate: 2-10 sccm;
Base pressure 20-300 mTorr;
Coating Pressure: 80-900 mTorr;
Coating time: 5-30 s.

Optionally, for the water barrier coating applied using hydrocarbons as the precursors, the typical coating process conditions are as follows:

Power frequency 13.56 MHz;
Precursor: Acetylene ($C_2H_2$);
Gas flow rate 1-10 sccm;
Carrier gas flow rate: 2-5 sccm;
Base pressure 20-300 mTorr;
Coating Pressure: 80-900 mTorr;
Coating time: 5-30 s.

An advantage of the water barrier layer on a plastic (e.g., COC or COP) vial is that the layer significantly prevents the ingress of moisture during the shelf life (e.g., two years) in which a lyophilized drug may be stored at room temperature in the vial. The lyophilized drug is supersensitive to water and thus the water barrier layer may be utilized to prevent the drug from absorbing moisture.

Various aspects of the invention will be illustrated in more detail with reference to the following Examples, but it should be understood that the present invention is not deemed to be limited thereto.

EXAMPLES

Example 1

Heat Transfer Variation in COP Vials Made According to Inventive Method Versus Glass Vials In this example, heat transfer variation of standard glass vials by Schott GmbH was compared with that of Applicant's substantially flat bottomed coated COP 10 mL vials. The glass vials had a configuration substantially similar to the prior art vial 10 of FIG. 1. This example demonstrates that such variation is significantly lower for COP vials made in accordance with optional aspects of the disclosed concept than standard glass vials. This difference is attributable to lower variation in mass, density, wall thickness and flatness of the base of the COP vials according to an optional aspect of the disclosed concept, compared to the standard glass vials. The practical effect is much more consistent drying rates during lyophilization for Applicant's substantially flat bottomed COP vials compared to standard glass vials.

The heat transfer coefficient of vials (Kv) is dependent on wall thickness and mass of the vial. Material properties (e.g., thermal conductivity) may impact this as well. The contour or flatness of the vial base and contact of the base with the shelf (standing surface during lyophilization) is also impactful on the thermal efficiency. A standard vial, from Schott GmbH, was compared with flat bottom COP vials made in accordance with optional embodiments of the disclosed concept. It was concluded, based on results achieved, that the substantially flat bottomed vials improved heat transfer during lyophilization. Better heat transfer enables the better lyophilization cycle times compared to glass vials. More consistent heat transfer could also be achieved due to more consistent mass and density across a batch of vials.

The glass vials had a mass of 11.708 g, ±0.085 g. Applicant's substantially flat bottomed coated COP vials had a mass of 6.726±0.005 g. Thus, Applicant's vials had a significantly more consistent mass across the batch than the glass vials. This improved mass consistency helped to provide more consistent heat transfer for lyophilization in Applicant's vials.

Figure 8:
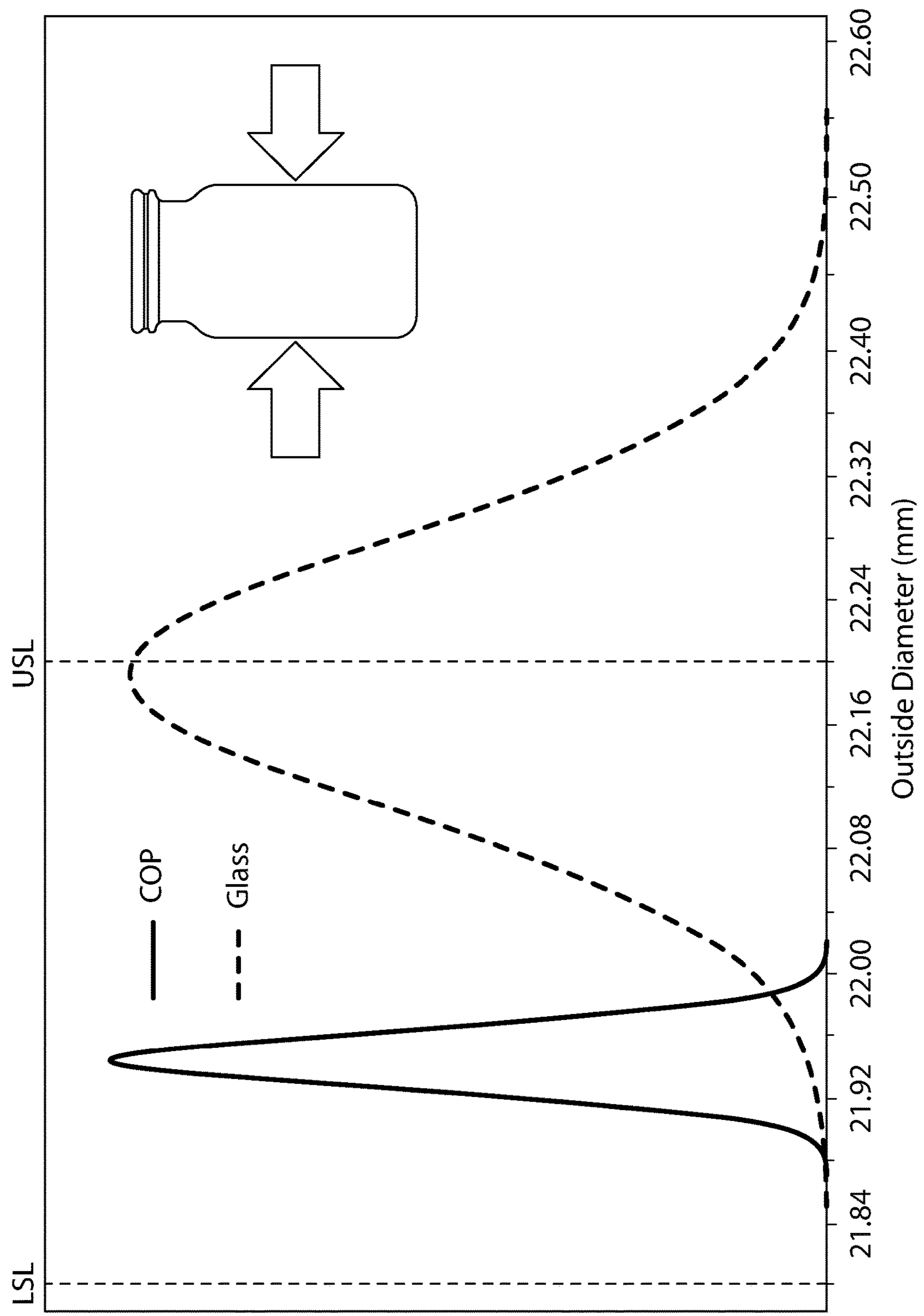
FIG. 8 is a graph comparing dimensional variability of polymer vials according to the disclosed concept and prior art glass vials.

Consistency in vial side wall thickness, radially 360° around, as opposed to from top to bottom along the central axis, is another metric that affects thermal efficiency. Applicant's coated COP flat bottomed vial outer diameters were measured in this way and compared with the glass vials. The results of these measurement comparisons are provided in FIG. 8. As the data show, the glass vials had five times more variation in outer diameter than Applicant's COP vials.

Kv, as used in this study, is mathematically represented as follows.

$$K_V = \frac{\Delta Hsub * \dot{m}}{\text{Area} * (Tshelf - Tbottom)} \text{ Where:}$$

$\Delta Hsub = 660$ cal/g (obtained from Pikal 1983 article)

$$\Lambda = \pi\left(\frac{d}{2}\right)^2 \text{ and } d = 24 \text{ mm},$$

which is the outer diameter of the vial bottom $T_{shelf} = -5°$ C.

$$\dot{m} = \frac{(\text{mass of vial} + \text{water before cycle}) - (\text{mass of vial} + \text{ice after cycle})}{\text{time spent in vacuum}}$$

$T_{bottom}$ = unknown – measure experimentally with thermocouple

The Kv of several flat bottomed coated COP vials was measured against that of several Schott glass vials. Results of these measurements are shown in the following table.

TABLE 3

| Vial Type | Kv *10$^4$ (cal/s/cm$^2$/° C.) | Standard Deviation |
|---|---|---|
| Glass | 4.23 | ±0.19 |
| Coated COP (Flat Bottom) | 3.56 | ±0.07 |

Figure 9:
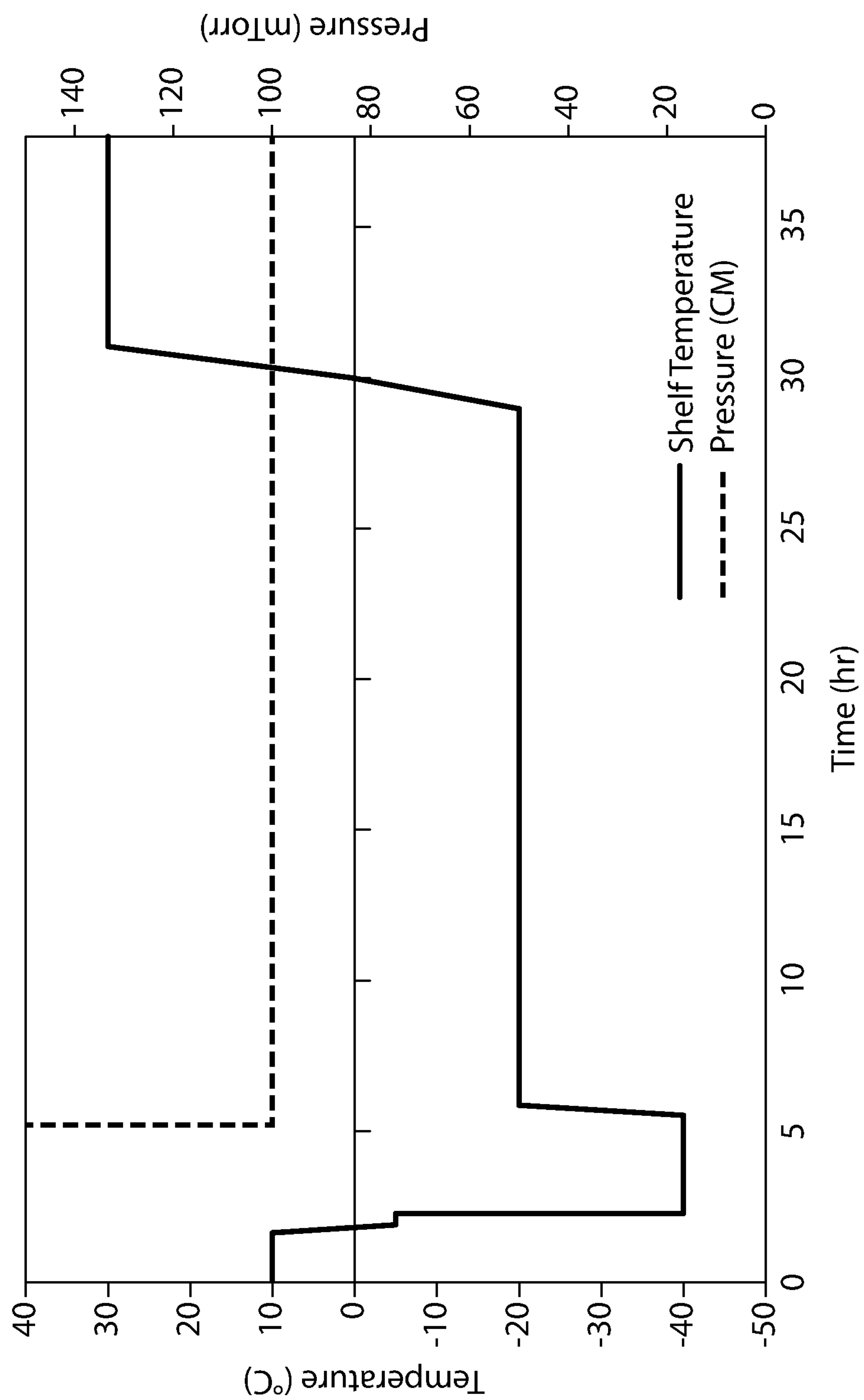
FIG. 9 is a graph showing parameters of the lyophilization cycle used for an exemplary study comparing glass vials with COP vials in accordance with optional embodiments of the disclosed concept.

FIG. 9 graphically represents the parameters under which medication in the vials was lyophilized in this study. The following table compares data between the two types of vials relating to water lost during lyophilization.

TABLE 4

| Relative Standard Deviation in % Water Lost at Time Points During Primary Drying Cycle | | |
|---|---|---|
| Vial Type | After 18 hrs | After 23 hrs |
| Glass | 6.5 | 0.2 |
| Coated COP (Flat Bottom) | 1.7 | 0.5 |

This comparative study shows more consistent heat transfer in the coated flat bottomed COP vial batches compared to the standard glass vials. More consistent drying rates within a COP vial batch compared to glass were also found. A pharmaceutical formulation having the following components was stored in each type of vial for comparison: 1 mg/ml IVIg, 10 mM glycine, 5% w/v sucrose and 0.02% v/v polysorbate 20. Residual cake moisture content was 0.62±0.09% in the glass vials and 0.63±0.07% in the silica-coated COP vials. Residual moisture content (<1%), cake appearance, reconstitution time, and monomeric protein recovery were similar for lyophilized formulations in both types of vials. The differences were observed in particle levels in formulations lyophilized within silica-coated flat bottomed COP vials compared to glass vials. The coated COP vials, in accordance with optional embodiments of the disclosed concept, in comparison with the borosilicate glass vials, provide the following characteristics: facilitate more consistent heat transfer and drying rates due to vial mass consistency within a batch; accommodate the same overall cycle time for lyophilization; and produce similar cake quality, reconstitution time, monomeric protein recovery and no wall residue.

While the invention has been described in detail and with reference to specific examples thereof, it will be apparent to one skilled in the art that various changes and modifications can be made therein without departing from the spirit and scope thereof.

What is claimed is:

1. A method for making a polymer vial by injection stretch blow molding, the method comprising:

a. providing a mold, the mold comprising a first mold part and a second mold part, the first mold part and the second mold part being configured to meet along a central axis to form an outer shape of a sidewall of the vial, wherein respective interior sizes and configurations of the first mold part and the second mold part mirror each other, the mold further comprising a base mold configured to form a base of the vial, the base mold having a substantially flat molding surface, wherein at least 80% of the molding surface of the base mold occupies a single plane, the first mold part, the second mold part, and the base mold together defining a mold cavity when the mold is in a blowing position in which the base mold is in position relative to the first and second mold parts to form the base of the vial;

b. providing a mandrel within the mold and a molten polymer preform onto the mandrel, stretching the preform with the mandrel to extend an end thereof past respective molding surfaces of the first mold part and the second mold part, wherein the base mold is axially distal to a location of the base mold when the mold is in the blowing position;

c. moving the base mold axially towards the first mold part and the second mold part to place the mold in the blowing position; and d. blowing gas into the preform such that the preform expands within the mold cavity and conforms to respective surfaces of the first mold part, the second mold part, and the base mold when the mold is in the blowing position, wherein the substantially flat molding surface of the base mold is positioned entirely axially below respective molding surfaces of the first mold part and second mold part, wherein the base of the vial at a first location that is adjacent to the sidewall has a first thickness that is less than a second thickness of the base at a second location between a geometric center of the base and the first location.

2. The method of claim 1, wherein neither the first mold part nor the second mold part form any of the base of the vial.

3. The method of claim 2, wherein the base mold forms no part of the sidewall of the vial.

4. The method of claim 1, wherein each of the first mold part and the second mold part include a first curved mold surface that leads to a second curved mold surface, the first curved mold surface following a radius with an imaginary center positioned in the mold cavity, the second curved mold surface following a radius with an imaginary center positioned outside the mold cavity.

5. The method of claim 4, wherein no portion of the substantially flat molding surface of the base mold extends axially above the second curved mold surface.

6. The method of claim 1, the base of the polymer vial that is made by the method having a base surface area, the sidewall of the polymer vial extending up from the base, the base and the sidewall defining an interior configured to house product, the sidewall narrowing at an upper section of the vial to form a neck leading to an opening that provides access to the interior, the vial being symmetrical about a central axis, a lower portion of the sidewall comprising a first surface that is outwardly curved along a first radius having an imaginary center positioned within the vial, wherein the base is positioned below the first surface and is substantially flat such that at least 80% of the base surface area comprises a standing base surface occupying a single plane.

7. The method of claim 6, wherein the base of the polymer vial that is made by the method is, in its entirety, positioned below the first surface.

8. The method of claim 6, the polymer vial that is made by the method further comprising a second surface that extends from and is positioned below the first surface, the second surface being inwardly curved along a second radius having an imaginary center positioned outside of the vial, the second surface terminating at a peripheral edge of the base from which the standing base surface extends inwardly towards the central axis, the standing base being configured to contact and rest on a flat support surface so as to orient the vial in an upright position.

9. The method of claim 1, wherein the polymer vial that is made by the method is made from cyclic olefin polymer or cyclic olefin copolymer.

10. The method of claim 1, the polymer vial that is made by the method comprising a PECVD water barrier coating or layer having a water contact angle of from 80 to 180 degrees, wherein the PECVD water barrier coating or layer is deposited on an interior surface or exterior surface of the vial.

11. A method for making a polymer vial by injection stretch blow molding, the method comprising:

a. providing a mold, the mold comprising a first mold part, a second mold part, and a base mold, wherein the first mold part and the second mold part are configured to meet along a central axis to form an outer shape of a sidewall of the vial, wherein respective interior sizes and configurations of the first mold part and the second mold part mirror each other, wherein the base mold comprises a substantially flat molding surface and is configured to form a base of the vial, the first mold part, the second mold part, and the base mold together defining a mold cavity when the mold is in a blowing position in which the base mold is in position relative to the first and second mold parts to form the base of the vial;

b. providing a mandrel within the mold and a molten polymer preform onto the mandrel, stretching the preform with the mandrel to extend an end thereof past respective molding surfaces of the first mold part and the second mold part, wherein the base mold is axially distal to a location of the base mold when the mold is in the blowing position;

C. moving the base mold axially towards the first mold part and the second mold part to place the mold in the blowing position; and d. blowing gas into the preform such that the preform expands within the mold cavity and conforms to respective surfaces of the first mold part, the second mold part, and the base mold when the mold is in the blowing position, wherein the substantially flat molding surface of the base mold is positioned entirely axially below respective molding surfaces of the first mold part and second mold part, wherein each of the first mold part and the second mold part include a first curved mold surface that leads to a second curved mold surface, the first curved mold surface following a radius with an imaginary center positioned in the mold cavity and the second curved mold surface following a radius with an imaginary center positioned outside the mold cavity.

12. The method of claim 11, wherein at least 80% of the molding surface of the base mold occupies a single plane.

13. The method of claim 11, wherein neither the first mold part nor the second mold part form any of the base of the vial, and the base mold forms no part of the sidewall of the vial.

14. The method of claim 11, wherein no portion of the substantially flat molding surface of the base mold extends axially above the second curved mold surface.

15. The method of claim 11, wherein a lower portion of the sidewall of the polymer vial comprises a first surface that is outwardly curved along a first radius having an imaginary center positioned within the vial and a second surface that extends from and is positioned below the first surface, the second surface being inwardly curved along a second radius having an imaginary center positioned outside of the vial, the second surface terminating at a peripheral edge of the base.

16. The method of claim 11, the polymer vial that is made by the method comprising a PECVD water barrier coating or layer having a water contact angle of from 80 to 180 degrees, wherein the PECVD water barrier coating or layer is deposited on an interior surface or exterior surface of the vial.

17. A method for making a polymer vial by injection stretch blow molding, the method comprising:

a. providing a mold, the mold comprising a first mold part and a second mold part, the first mold part and the second mold part being configured to meet along a central axis to form an outer shape of a sidewall of the vial, wherein respective interior sizes and configurations of the first mold part and the second mold part mirror each other, the mold further comprising a base mold configured to form a base of the vial, the base mold having a substantially flat molding surface, wherein at least 80% of the molding surface of the base mold occupies a single plane, the first mold part, the second mold part, and the base mold together defining a mold cavity when the mold is in a blowing position in which the base mold is in position relative to the first and second mold parts to form the base of the vial, wherein neither the first mold part nor the second mold part form any of the base of the vial, and the base mold forms no part of the sidewall of the vial;

b. providing a mandrel within the mold and a molten polymer preform onto the mandrel, stretching the preform with the mandrel to extend an end thereof past respective molding surfaces of the first mold part and second mold part, wherein the base mold is axially distal to a location of the base mold when the mold is in the blowing position;

c. moving the base mold axially towards the first mold part and second mold part to place the mold in the blowing position; and d. blowing gas into the preform such that the preform expands within the mold cavity and conforms to respective surfaces of the first mold part, the second mold part, and the base mold when the mold is in the blowing position, wherein the substantially flat molding surface of the base mold is positioned entirely axially below respective molding surfaces of the first mold part and the second mold part, wherein the sidewall of the vial adjacent the base thereof has a thickness that is the same as, or less than, a thickness of the base of the vial.

18. A method for making a polymer vial by injection stretch blow molding, the method comprising:

a. providing a mold, the mold comprising a first mold part and a second mold part, the first mold part and the second mold part being configured to meet along a central axis to form an outer shape of a sidewall of the vial, wherein respective interior sizes and configurations of the first mold part and the second mold part mirror each other, the mold further comprising a base mold configured to form a base of the vial, the base mold having a substantially flat molding surface, wherein at least 80% of the molding surface of the base mold occupies a single plane, the first mold part, the second mold part, and the base mold together defining a mold cavity when the mold is in a blowing position in which the base mold is in position relative to the first and second mold parts to form the base of the vial, wherein each of the first mold part and the second mold part include a first curved mold surface that leads to a second curved mold surface, the first curved mold surface following a radius with an imaginary center positioned in the mold cavity and the second curved mold surface following a radius with an imaginary center positioned outside the mold cavity, wherein no portion of the substantially flat molding surface of the base mold extends axially above the second curved mold surface;

b. providing a mandrel within the mold and a molten polymer preform onto the mandrel, stretching the preform with the mandrel to extend an end thereof past respective molding surfaces of the first mold part and second mold part, wherein the base mold is axially distal to a location of the base mold when the mold is in the blowing position;

c. moving the base mold axially towards the first mold part and second mold part to place the mold in the blowing position; and d. blowing gas into the preform such that the preform expands within the mold cavity and conforms to respective surfaces of the first mold part, the second mold part, and the base mold when the mold is in the blowing position, wherein the substantially flat molding surface of the base mold is positioned entirely axially below respective molding surfaces of the first mold part and the second mold part, wherein the sidewall of the vial adjacent the base thereof has a thickness that is the same as, or less than, a thickness of the base of the vial.

19. The method of claim 17, the polymer vial that is made by the method comprising a PECVD water barrier coating or layer having a water contact angle of from 80 to 180 degrees, wherein the PECVD water barrier coating or layer is deposited on an interior surface or exterior surface of the vial.

* * * * *